US012588794B2

(12) United States Patent
Denda et al.

(10) Patent No.: US 12,588,794 B2
(45) Date of Patent: Mar. 31, 2026

(54) AUTONOMOUS TRAVEL PATH PLANNING METHOD

(71) Applicant: MURATA MACHINERY, LTD., Kyoto (JP)

(72) Inventors: Yuki Denda, Kyoto (JP); Hideo Shitamoto, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 329 days.

(21) Appl. No.: 18/033,852

(22) PCT Filed: Aug. 6, 2021

(86) PCT No.: PCT/JP2021/029314
§ 371 (c)(1),
(2) Date: Apr. 26, 2023

(87) PCT Pub. No.: WO2022/097335
PCT Pub. Date: May 12, 2022

(65) Prior Publication Data
US 2023/0397789 A1 Dec. 14, 2023

(30) Foreign Application Priority Data
Nov. 4, 2020 (JP) ................................. 2020-184308

(51) Int. Cl.
*A47L 11/40* (2006.01)
*G05D 1/00* (2024.01)
(52) U.S. Cl.
CPC ........ *A47L 11/4011* (2013.01); *G05D 1/0219* (2013.01); *G05D 1/0274* (2013.01); *A47L 2201/04* (2013.01)

(58) Field of Classification Search
None
See application file for complete search history.

(56) References Cited

U.S. PATENT DOCUMENTS

| | | | |
|---|---|---|---|
| 2018/0113471 A1 | 4/2018 | Sakaguchi et al. | |
| 2019/0004520 A1* | 1/2019 | Maeno ................ | G05D 1/0236 |
| 2019/0208978 A1 | 7/2019 | Shitamoto et al. | |
| 2020/0081437 A1* | 3/2020 | Nakashima ....... | B60W 30/0956 |

FOREIGN PATENT DOCUMENTS

| | | |
|---|---|---|
| JP | 2017-211758 A | 11/2017 |
| JP | 2018-073008 A | 5/2018 |
| JP | 2018-099113 A | 6/2018 |
| JP | 2018-116614 A | 7/2018 |
| WO | 2018/043180 A1 | 3/2018 |

OTHER PUBLICATIONS

Official Communication issued in International Patent Application No. PCT/JP2021/029314, mailed on Oct. 26, 2021.

* cited by examiner

*Primary Examiner* — Eric J Rosen
(74) *Attorney, Agent, or Firm* — Keating & Bennett, LLP

(57) ABSTRACT

An autonomous travel path planning method includes obtaining a travel area to perform filling travel in a global map, calculating a deviation width of a main body of an autonomous traveling device when it changes its direction, based on a size of the autonomous traveling device, a turning radius thereof, a turning movement distance, and a grid size, creating an inner rounding path corresponding to at least a portion of the deviation width, and creating a filling travel path so as to fill a second grid area.

10 Claims, 29 Drawing Sheets

AUTONOMOUS TRAVEL PATH PLANNING METHOD

BACKGROUND OF THE INVENTION

1. Field of the Invention

The present invention relates to an autonomous travel path planning method, in particular, to a method to plan a travel path for an autonomous traveling body.

2. Description of the Related Art

Conventionally, there is known an autonomous traveling body that autonomously travels according to path planning from a travel start position to a travel end position. As an example, an autonomous travel type floor cleaning machine reproduces a travel path and cleaning conditions taught by user's operation, so as to autonomously travel the taught travel path while autonomously performing cleaning according to the taught cleaning conditions.

Further, in another path planning method, a traveling schedule is created by projecting a filling travel target area of an environmental map onto a grid coordinate of a predetermined size, and by determining order of passing through grid cells (see, for example, PCT publication No. 2018/043180).

In addition, there is known a travel path planning device that sets a working target area inside of an environmental area while setting an outer peripheral area for a harvester to change its direction in an outer periphery thereof (see, for example, JP-A-2018-099113).

SUMMARY OF THE INVENTION

In general, the body of the autonomous traveling body has different sizes between the length and the width, and has a rectangular shape in a plan view, for example. Therefore, if a filling travel path planning is grid-based, the body may be deviated outward from the peripheral boundary of the travel area when performing the filling travel, at a place where a body orientation in teaching travel is different from that in filling travel (e.g., at a place where the body turns around). In addition, if the planning of filling travel is performed within a range in which the body of the autonomous traveling body is not deviated (e.g. if the filling travel target area is simply reduced), an unfilled area may be generated near the outer periphery.

Preferred embodiments of the present invention prevent autonomous traveling bodies from being deviated outward from a peripheral boundary of a travel area in a grid-based autonomous travel path planning.

A plurality of aspects of preferred embodiments of the present invention are described below and can be arbitrarily combined as necessary.

An autonomous travel path planning method according to an aspect of a preferred embodiment of the present invention is a method to plan a path for an autonomous traveling body to autonomously travel, the method includes obtaining a travel area to perform filling travel in an environmental map, calculating a deviation width of the body of the autonomous traveling body from the travel area when the autonomous traveling body changes its direction, based on a body size of the autonomous traveling body, a turning radius thereof, a turning movement distance, and a grid size, creating one or more inner rounding paths corresponding to at least a portion of the deviation width, creating a grid area including a boundary at a position corresponding to an innermost inner rounding path, and creating a filling travel path so as to fill an inside of the grid area.

The turning movement distance is a movement locus of a wheel center when the body turns.

In this method, one or more inner rounding paths corresponding to at least a portion of the deviation width are created, and further the filling travel path is created inside of the grid area. As a result, the travel path is planned, which enables the autonomous traveling body to travel without deviation from the peripheral boundary of the travel area, in the grid-based autonomous travel path.

If there are a plurality of inner rounding paths, they may be independent of each other, or some of them may be overlapped.

In creating the inner rounding paths, it may be possible to calculate a maximum number of paths necessary to cover an entirety of the deviation width. In this method, the entirety of the deviation width is securely covered by the inner rounding paths. In other words, although the deviation width amount can differ depending on location, no unfilled location is generated by creating the number of inner rounding paths necessary to cover the deviation width.

In obtaining the travel area, it may be possible to obtain the travel area by teaching the boundary of the travel area with the autonomous traveling body so as to create an outer periphery teaching path.

This method may further include determining the autonomous travel path by continuously connecting an outer rounding path created based on the outer periphery teaching path, the filling travel path, and the inner rounding path.

In this method, the autonomous travel path including the outer rounding path is planned.

This method may further include setting a start position of the filling travel path on the outer rounding path, and setting an end position of the filling travel path near the start position inward of the outer rounding path.

In this way, the end position of the filling travel path is clarified. Furthermore, as the end position is set in a vicinity of the start position, continuous travel can be performed smoothly. In addition, by setting the end position at a position shifted inward from the start position, deviation of the path from a teaching range can be prevented when planning a path to return to the end position (i.e., the start position) on the outer rounding path.

This method may further include creating a test travel path to detect an environmental change, and causing the autonomous traveling body to travel the test travel path.

Conventionally, if an environmental change occurs in the filling travel, the travel is stopped so as to prevent the autonomous traveling body from losing its own position on the way and being unable to follow the planned travel path. In this case, it is necessary to teach the travel range and create the path again for unfilled places thereafter including periphery of the stop position. In this method, the autonomous traveling body travels the test travel path, thereby an environmental change can be detected prior to the filling travel. Therefore, unlike a conventional method, there is little influence of an environmental change on an actual autonomous travel.

This method may further include providing a notification of the environmental change detected while the autonomous traveling body is traveling the test travel path.

In this method, a user can promptly know the environmental change.

This method may further include stopping the test travel after the environmental change is detected while the autonomous traveling body is traveling the test travel path.

In this method, the user can promptly start reteaching the travel range.

This method may further include returning the autonomous traveling body to a position on the test travel path after stopping the test travel.

In this method, the user can promptly start reteaching the travel range.

This method may further include moving the autonomous traveling body to a position in the travel area after stopping the test travel.

In this method, if a test travel start position is different from the filling travel start position, for example, the autonomous traveling body can be moved to the filling travel start position.

In the autonomous travel path planning methods according to preferred embodiments of the present invention, it is possible to prevent the autonomous traveling body from being deviated outward from the peripheral boundary of the travel area, in the grid-based autonomous travel path planning.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. First Preferred Embodiment

Figure 1:
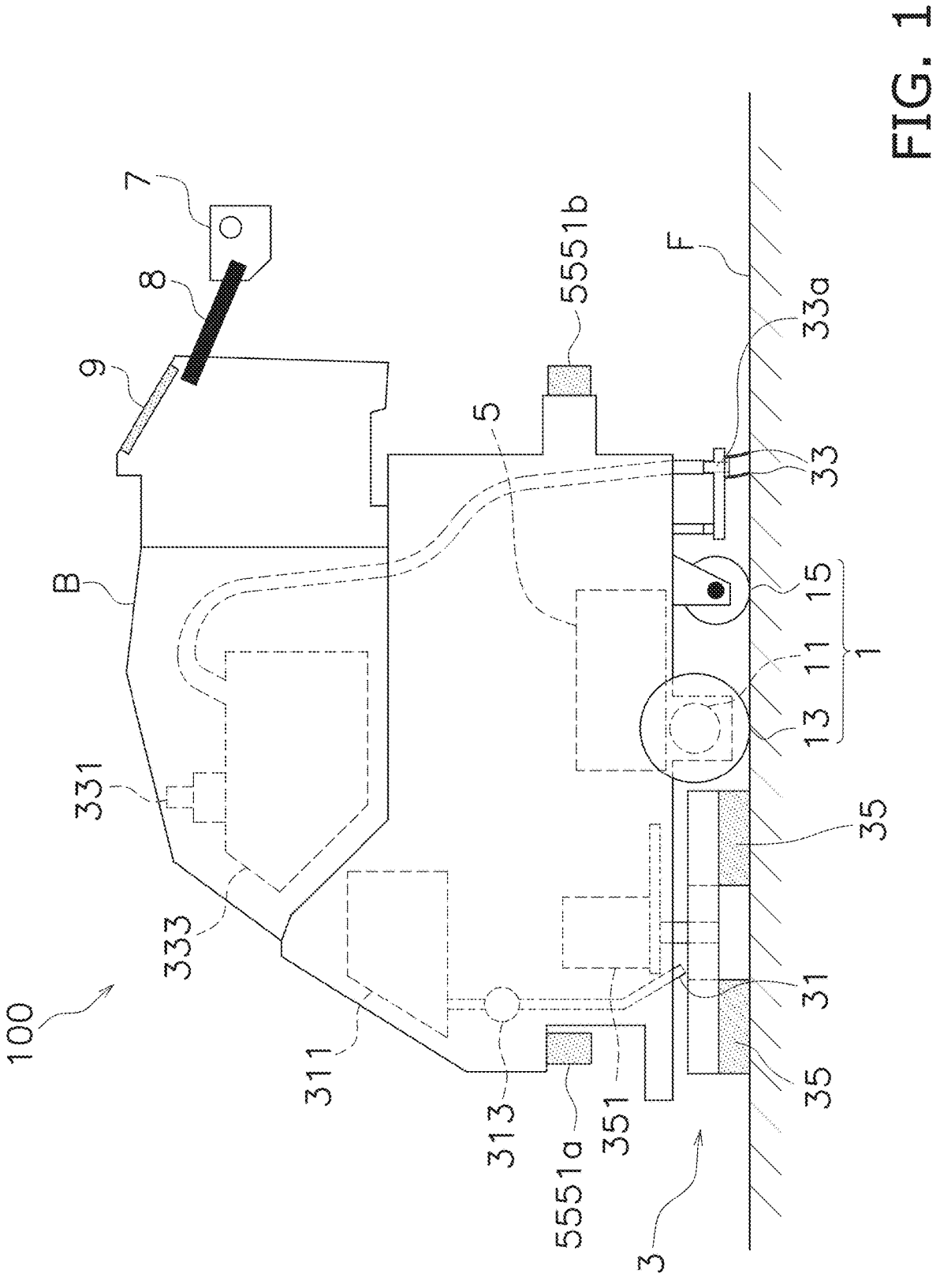
FIG. 1 is a diagram illustrating an overall structure of an example of an autonomous traveling device according to a first preferred embodiment of the present invention.

With reference to FIG. 1, an overall structure of an autonomous traveling device 100 (an example of an autonomous traveling body) according to a first preferred embodiment is described below. FIG. 1 is a diagram illustrating an overall structure of an example of the autonomous traveling device. The autonomous traveling device 100 is a cleaning machine that autonomously reproduces set cleaning conditions and travel path.

The autonomous traveling device 100 includes a travel unit 1. The travel unit 1 is a device that causes the autonomous traveling device 100 to travel. The travel unit 1 includes a main body B of the autonomous traveling device 100. The travel unit 1 includes a travel motor 11 and a main wheel 13 connected to an output rotation shaft of the travel motor 11 so as to rotate along with rotation of the travel motor 11, which are disposed on each of the left and right ends of a bottom portion of the main body B.

The autonomous traveling device 100 includes a cleaning unit 3. The cleaning unit 3 is a device provided to the bottom portion of the main body B, so as to clean a floor surface F according to designated cleaning conditions. The cleaning unit 3 of this preferred embodiment includes a cleaning liquid discharge port 31, a squeegee 33, and a cleaning member 35.

The cleaning liquid discharge port 31 discharges cleaning liquid (e.g., water) supplied from a cleaning liquid supply tank 311 with a cleaning liquid supply pump 313 to the floor surface F on the front side of the main body B. The squeegee 33 is disposed on the rear side of the bottom surface of the main body B, so as to collect the cleaning liquid remaining on the floor surface F. The cleaning member 35 is disposed on the front side of the bottom surface of the main body B, so as to rotate on the floor surface F with the cleaning liquid along with rotation of a cleaning member rotating motor 351, thereby cleaning the floor surface F.

With the cleaning unit 3 described above, the autonomous traveling device 100 can perform cleaning operation using the cleaning liquid, so as to polish the floor surface F with the cleaning member 35.

In another preferred embodiment, the squeegee 33 may be equipped with a suction port 33a. When a collecting member 333 is made negative pressure by a suction motor 331, the suction port 33a can suck the cleaning liquid, dust, and the like collected by the squeegee 33 so as to send them to the collecting member 333.

The autonomous traveling device 100 includes a control unit 5. The control unit 5 is a computer system including a CPU, a storage device (such as a RAM, a ROM, a hard disk drive, and/or an SSD), and various interfaces. The control unit 5 performs various controls regarding to the autonomous traveling device 100 (as described later).

The autonomous traveling device 100 includes a travel path teaching unit 7. The travel path teaching unit 7 is a device that receives operator's operations to move the travel unit 1. The travel path teaching unit 7 is mounted via an attachment member 8 to the upper rear side of the main body B. In this way, the operator can operate the travel unit 1 to move by operating the travel path teaching unit 7 (as described later).

As another preferred embodiment, the travel path teaching unit 7 may not be mounted to the main body B. In this case, the travel path teaching unit 7 is a controller such as a joy stick, for example. In this way, the operator can remote control the autonomous traveling device 100.

The autonomous traveling device 100 includes a setting unit 9. The setting unit 9 is a console panel for various settings regarding to the autonomous traveling device 100, and is mounted to the surface of the main body B on the upper rear side. In addition, the setting unit 9 is disposed near the travel path teaching unit 7. In this way, the operator can operate the setting unit 9 while operating the travel path teaching unit 7 so as to control the travel unit 1.

As another preferred embodiment, the setting unit 9 may not be mounted to the main body B. In this case, the setting unit 9 may be a console such as a portable terminal that can perform wireless communication, for example. In this way, the operator can perform remote setting of the autonomous traveling device 100.

Figure 2:
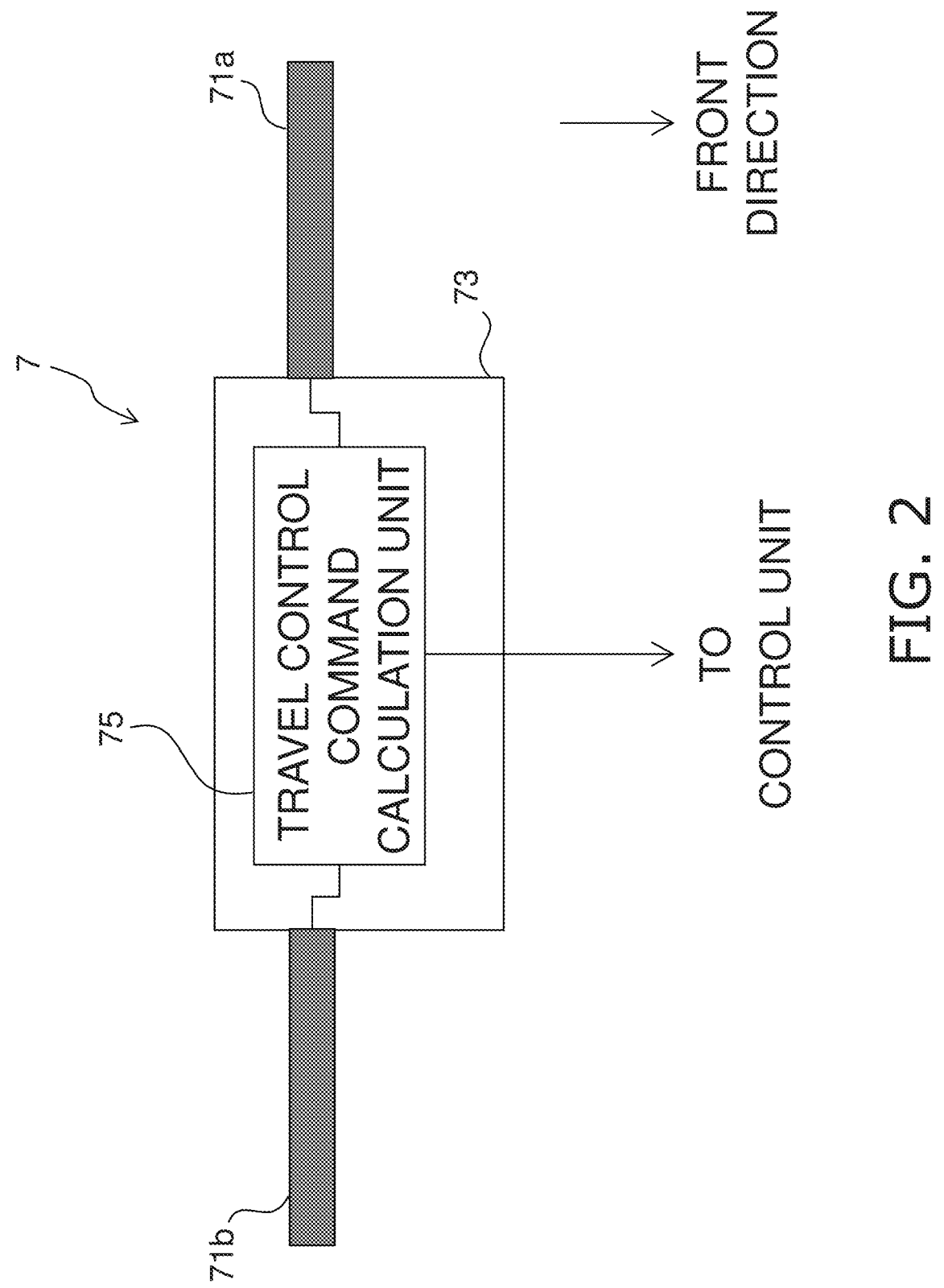
FIG. 2 is a diagram illustrating an example of a structure of a travel path teaching unit.

With reference to FIG. 2, an example of a structure of the travel path teaching unit 7 is described. FIG. 2 is a diagram illustrating an example of a structure of the travel path teaching unit.

The travel path teaching unit 7 includes handles 71a and 71b. The handles 71a and 71b are respectively mounted to the left and right side surfaces of a package 73. The handles 71a and 71b are used when the operator controls the autonomous traveling device 100.

For instance, the operator who holds the handles 71a and 71b can apply a force to the autonomous traveling device 100 either in a pulling direction toward the operator or in a pushing direction, using the handles 71a and 71b. By adjusting forces applied to the handles 71a and 71b, respectively, the operator can adjust the travel direction of the autonomous traveling device 100. For instance, when a pulling force is applied to the right side handle 71a viewed from the front of the autonomous traveling device 100, the autonomous traveling device 100 changes its direction to the left.

The handles 71a and 71b are mounted to the housing 73 in a rotatable manner. In addition, the handles 71a and 71b are connected to the control unit 5 via a travel control command calculation unit 75. The travel control command calculation unit converts rotations of the handles 71a and 71b into electric signals and outputs the signals to the control unit 5. In this way, the operator can control the autonomous traveling device 100 (the travel unit 1) by rotation operations of the handles 71a and 71b.

For instance, by adjusting rotation directions of the handles 71a and 71b, the operator may be able to switch the travel direction of the autonomous traveling device 100 between forward and backward. In addition, by adjusting rotation amounts of the handles 71a and 71b, a travel speed of the autonomous traveling device 100 may be adjustable. Furthermore, it may be possible to change the travel direction of the autonomous traveling device 100 by differentiating the rotation amounts between the handle 71a and the handle 71b.

Figure 3:
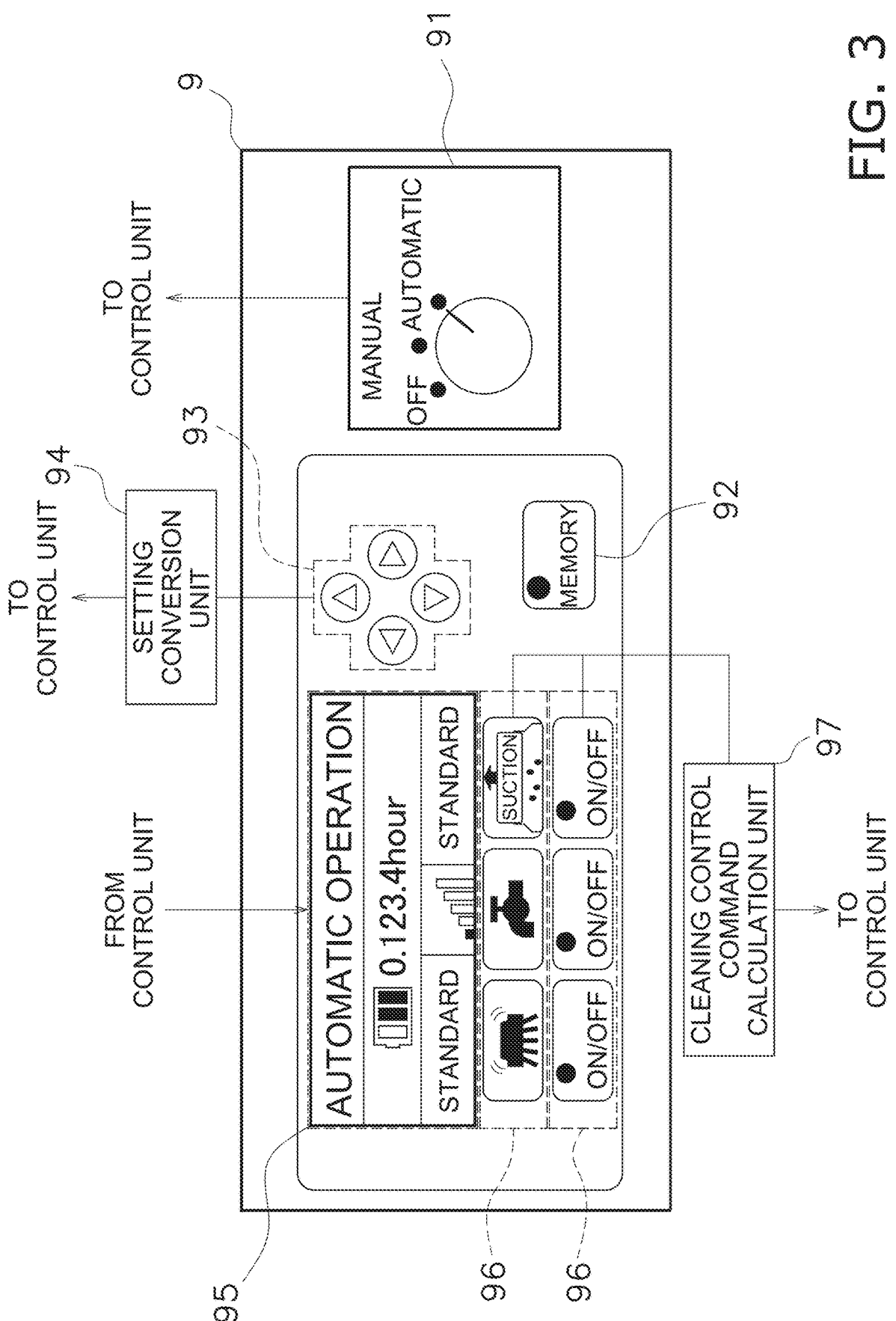
FIG. 3 is a diagram illustrating a structure of a setting unit.

With reference to FIG. 3, a structure of the setting unit 9 is described. FIG. 3 is a diagram illustrating a structure of the setting unit.

The setting unit 9 includes a selection unit 91. The selection unit 91 selects an operation mode of the autonomous traveling device 100, and outputs the selected mode information to the control unit 5. The operation modes of the autonomous traveling device 100 include an autonomous travel mode and a manual operation mode. The autonomous travel mode is an operation mode in which the autonomous traveling device 100 autonomously travels and cleans the floor surface F. The manual operation mode is an operation mode in which the autonomous traveling device 100 can be manually controlled by the operator. The selection unit 91 can be a selection switch as illustrated in FIG. 3, for example.

The setting unit 9 includes a manual operation memory switch 92. The manual operation memory switch 92 is a switch that starts or stops storing of the operator's manual operations of the autonomous traveling device 100. Specifically, when the manual operation memory switch 92 is pressed after the operation mode is set to the manual operation mode by the selection unit 91, a manual operation teaching mode is started as a sub operation mode of the manual operation mode, in which cleaning conditions and a travel path of the manual operation performed by the operator are taught to the autonomous traveling device 100. On the other hand, when the manual operation memory switch 92 is switched while executing the manual operation teaching mode, the manual operation teaching mode is stopped.

The manual operation memory switch 92 can be a push button switch as illustrated in FIG. 3, for example. In this case, the manual operation memory switch 92 is switched by pressing the push button switch.

The setting unit 9 includes a setting operation section 93. The setting operation section 93 includes a push switch, for example, which receives inputs of various settings regarding to the autonomous traveling device 100, and outputs the received setting information to the control unit 5 via a setting conversion unit 94. The setting conversion unit 94 includes a signal conversion circuit or a computer system that converts the input received by the setting operation section 93 into a signal readable by the control unit 5.

The setting unit 9 includes a display 95. The display 95 displays various setting information regarding to the autonomous traveling device 100, which are currently set. The display 95 is an LCD, an organic EL display, or the like, for example.

In another preferred embodiment, the display 95 may further display a current operation mode (the autonomous travel mode, the manual operation mode, or the manual operation teaching mode), operating time, or a remaining level of battery for driving the autonomous traveling device 100.

In still another preferred embodiment, the display 95 may display various setting procedures when performing various settings of the autonomous traveling device 100 with the setting operation section 93. In this way, it is possible to provide the user with information regarding to the autonomous traveling device 100 in a visual manner, so that the user can operate the setting unit 9 based on the displayed information.

In another preferred embodiment, the display 95 may be equipped with a touch panel. In this case, the selection unit 91, the manual operation memory switch 92, and/or the setting operation section 93, which are described above, may be realized by the touch panel.

The setting unit 9 may include a cleaning condition teaching unit 96. The cleaning condition teaching unit 96 receives input of cleaning conditions from the operator, and output the same to a cleaning control command calculation unit 97. The cleaning control command calculation unit 97 is a signal conversion circuit or a computer system that converts the cleaning conditions received by the cleaning condition teaching unit 96 into a signal readable by the control unit 5, and outputs the signal to the control unit 5.

Figure 4:
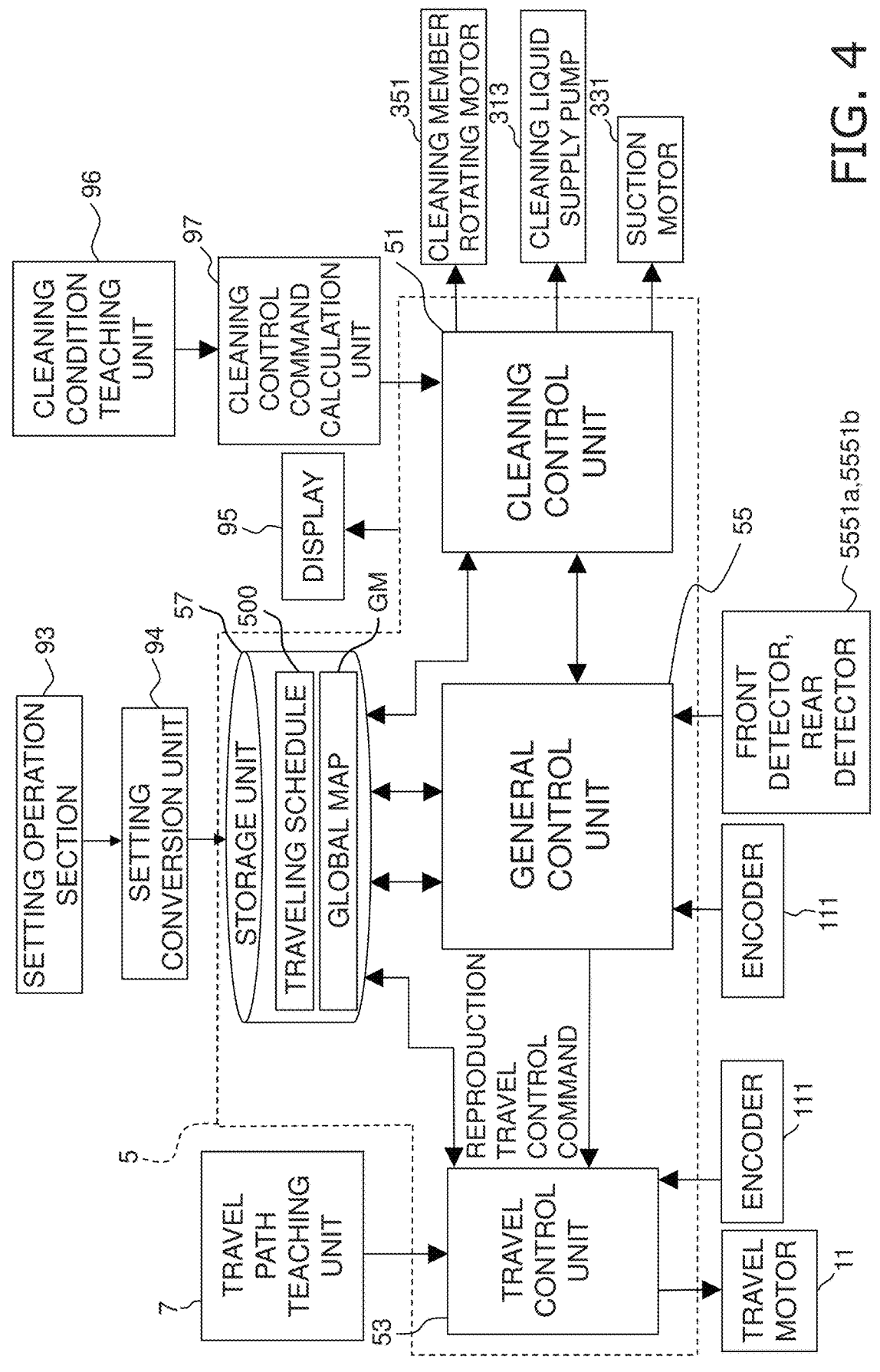
FIG. 4 is a diagram illustrating an overall structure of a control unit.

With reference to FIG. 4, an overall structure of the control unit 5 is described. FIG. 4 is a diagram illustrating an overall structure of the control unit. All or a portion of the functional blocks of the control unit 5 described below may be realized by a program executable by a computer system of the control unit 5. In this case, the program may be stored in a memory unit and/or a storage device. All or a portion of the functional blocks of the control unit 5 may be realized by a custom IC such as a system on chip (SoC).

The control unit 5 may include a single computer system or a plurality of computer systems. If the control unit 5 includes a plurality of computer systems, functions realized by the functional blocks of the control unit 5 can be assigned to the computer systems at an arbitrary ratio for execution, for example.

The control unit 5 includes a cleaning control unit 51. The cleaning control unit 51 supplies power to control a rotation speed, output, and the like for the cleaning member rotating motor 351, the cleaning liquid supply pump 313, and the suction motor 331.

In the example in which the setting unit 9 includes the cleaning condition teaching unit 96, the cleaning control unit 51 may receive taught cleaning conditions from the cleaning condition teaching unit 96 via the cleaning control command calculation unit 97, and may control the cleaning member rotating motor 351, the cleaning liquid supply pump 313, and the suction motor 331, based on the taught cleaning conditions.

In another preferred embodiment, when executing the autonomous travel mode, the cleaning control unit 51 may receive reproduction cleaning conditions, which indicate set values of the cleaning conditions in the autonomous travel mode, from a general control unit 55, and may control the cleaning unit 3 based on the reproduction cleaning conditions.

The control unit 5 includes a travel control unit 53. The travel control unit 53 controls the travel motor 11 based on the travel control command based on rotation amounts and rotation directions of the handles 71a and 71b received from the travel path teaching unit 7, or the travel control command received from the general control unit 55. In addition, the travel control unit 53 calculates rotation speed of the travel motor 11 based on a pulse signal output from an encoder 111 attached to the output rotation shaft of the travel motor 11.

The control unit 5 includes the general control unit 55. The general control unit 55 generally controls traveling of the autonomous traveling device 100. Specifically, based on information obtained by a front detector 5551a, a rear detector 5551b, and/or the encoder 111, the general control unit 55 calculates position information indicating a position on the floor surface F where the autonomous traveling device 100 is traveling. The general control unit 55 creates a traveling schedule 500 using the position information when executing the manual operation teaching mode. In another preferred embodiment, the general control unit 55 may calculate cleaning conditions in the autonomous travel mode so as to associate them with the traveling schedule 500.

On the other hand, when executing the autonomous travel mode, the general control unit 55 calculates a reproduction travel control command based on data stored in the traveling schedule 500, and outputs the same to the travel control unit 53. In this way, when executing the autonomous travel mode, the travel control unit 53 controls the travel motor 11 based on the reproduction travel control command, so that the autonomous traveling device 100 can autonomously move.

In a preferred embodiment where the traveling schedule 500 is associated with cleaning conditions, the general control unit 55 may control the cleaning control unit 51 based on the cleaning conditions stored in the traveling schedule 500 when executing the autonomous travel mode. In this way, the autonomous traveling device 100 can autonomously perform cleaning operation according to the cleaning conditions while autonomously traveling according to the traveling schedule 500.

The control unit 5 includes a storage unit 57. The storage unit 57 is a portion or an entirety of a storage area of the storage device of the computer system of the control unit 5, and stores various information regarding to the autonomous traveling device 100. Specifically, the storage unit 57 stores the traveling schedule 500 created by the general control unit 55, and various settings regarding to the autonomous traveling device 100 received from the setting operation section 93 and the setting conversion unit 94.

The travel control unit 53 and the general control unit 55 reads various settings regarding to the autonomous traveling device 100, and/or the traveling schedule 500, which are stored in the storage unit 57, as necessary, and can perform various adjustments and controls based on them.

Figure 5:
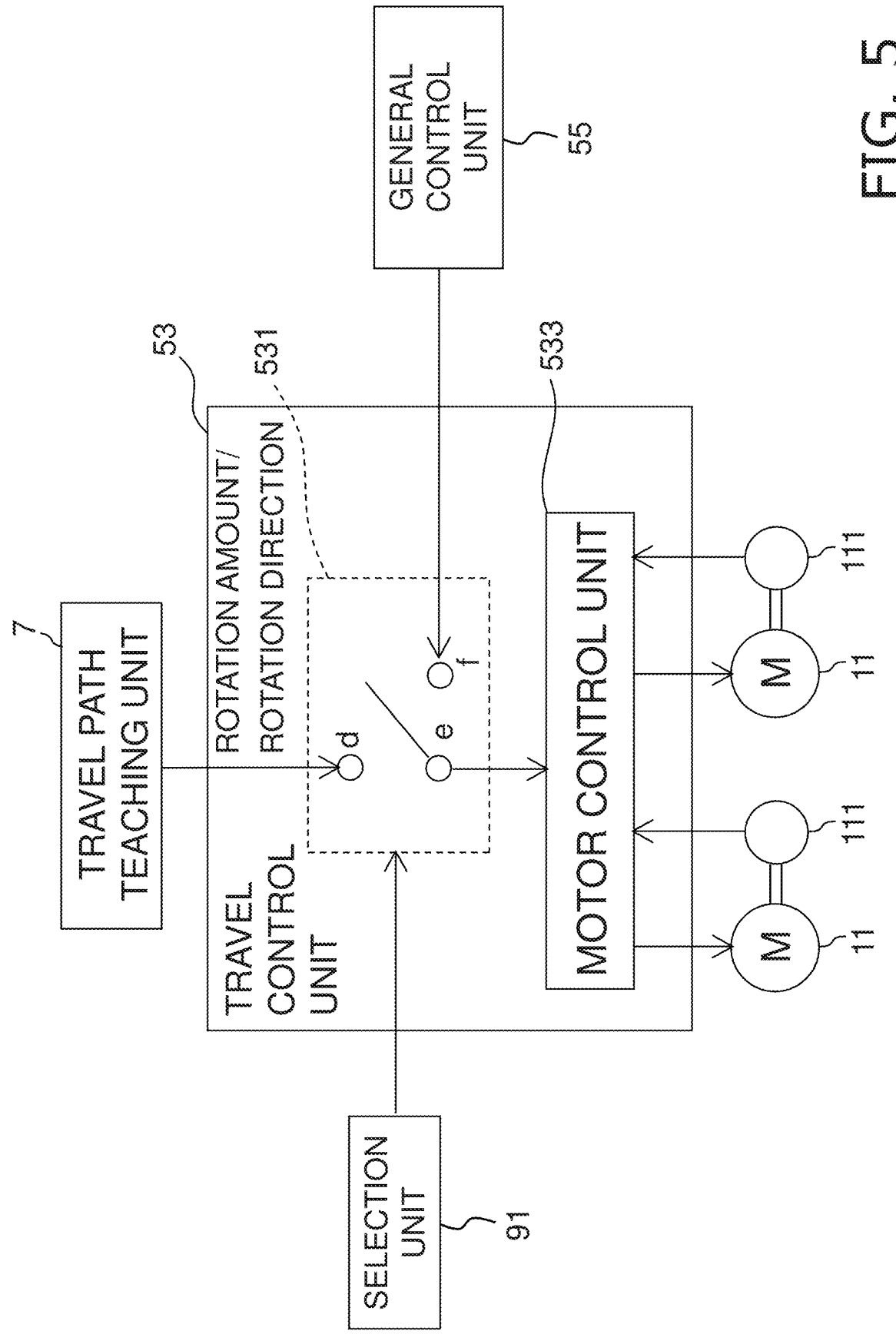
FIG. 5 is a diagram illustrating a detailed structure of a travel control unit.

With reference to FIG. 5, a structure of the travel control unit 53 is described in detail. FIG. 5 is a diagram illustrating a detailed structure of the travel control unit. The travel control unit 53 includes a travel selection unit 531. The travel selection unit 531 includes three terminals d, e, and f. The terminal d is connected to the travel path teaching unit 7, the terminal e is connected to a motor control unit 533, and the terminal f is connected to the general control unit 55.

The travel selection unit 531 selects connection between the terminal e and the terminal d, or connection between the terminal e and the terminal f, based on the operation mode selected by the selection unit 91. Specifically, if the manual operation mode is selected by the selection unit 91, the travel selection unit 531 connects the terminal e and the terminal d, thereby the travel path teaching unit 7 is connected to the motor control unit 533. In this way, when executing the manual operation mode or the manual operation teaching mode, the travel selection unit 531 can send a signal indicating rotation amounts and/or rotation directions of the handles 71*a* and 71*b* of the travel path teaching unit 7 to the motor control unit 533.

On the other hand, if the autonomous travel mode is selected by the selection unit 91, the travel selection unit 531 connects the terminal e and the terminal f, thereby the general control unit 55 is connected to the motor control unit 533. In this way, when executing the autonomous travel mode, the travel selection unit 531 can send the reproduction travel control command output from the general control unit 55 to the motor control unit 533.

The motor control unit 533 calculates a target rotation speed of the travel motor 11 based on the received rotation amounts and rotation directions of the handles 71*a* and 71*b* or the reproduction travel control command, and outputs to the travel motor 11 a drive power to rotate the travel motor 11 at the target rotation speed.

The motor control unit 533 calculates and feeds back an actual rotation speed of the travel motor 11 based on the pulse signal from the encoder 111, and calculates a drive power to be output to the travel motor 11. Therefore, the motor control unit 533 controls the travel motor 11 by using, for example, a proportional integral (PI) control theory, a proportional integral differential (PID) control theory, or the like.

In this preferred embodiment, the travel motor 11 and the main wheel 13 are mounted to each of the left and right ends of the bottom portion of the main body B. In this case, the motor control unit 533 controls the rotation speeds and the rotation directions of the left and right travel motors 11 independently, so as to determine the travel direction of the autonomous traveling device 100.

In another preferred embodiment, if the control unit 5 is a plurality of computer systems, the motor control unit 533 may be one of the computer systems. In other words, it may be possible that one computer system realizes only the function of the motor control unit 533. In this case, the motor control unit 533 is a motor control device using the PI control theory or the PID control theory, for example.

Figure 6:
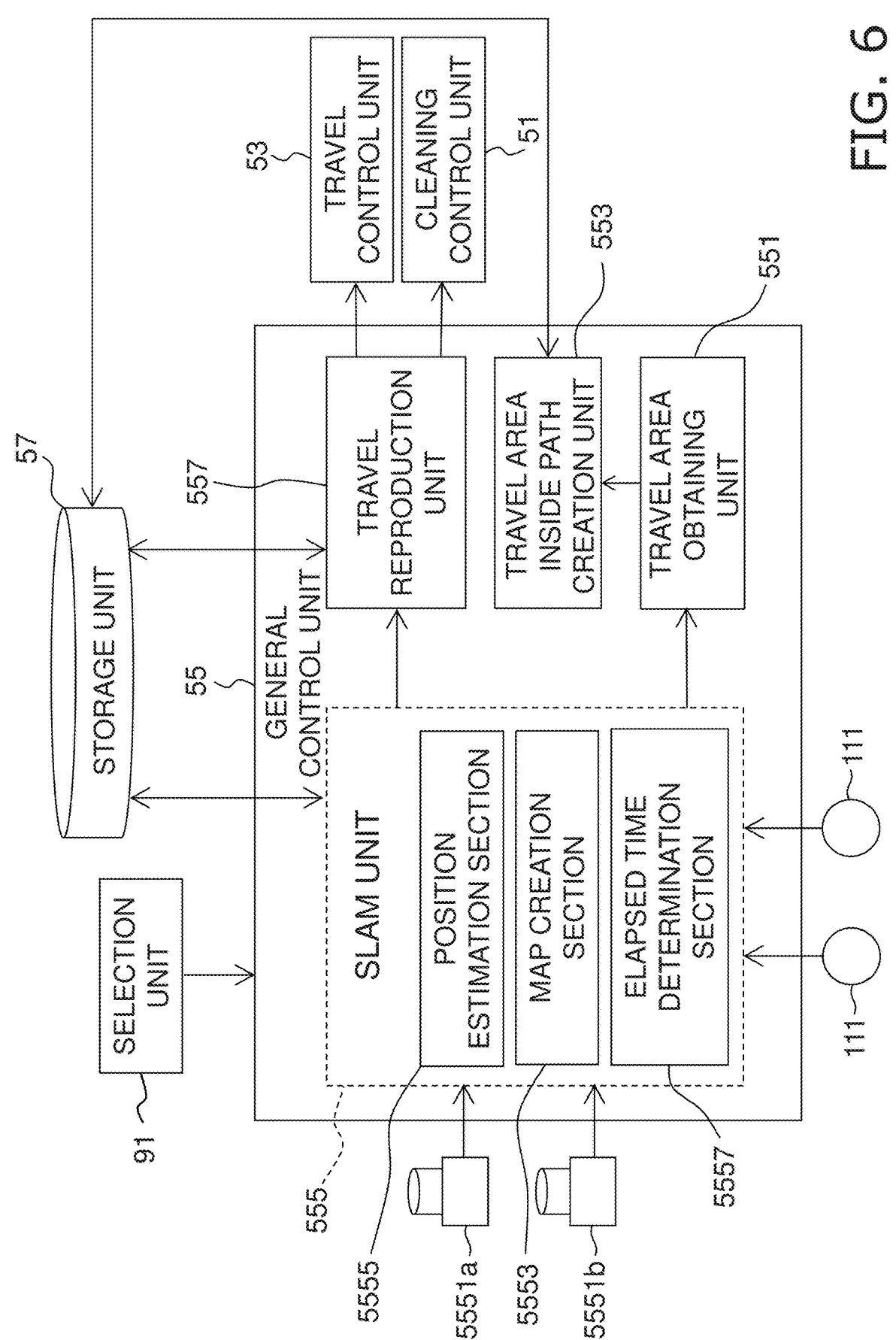
FIG. 6 is a diagram illustrating a detailed structure of a general control unit.

With reference to FIG. 6, a structure of the general control unit 55 is described in detail. FIG. 6 is a diagram illustrating a detailed structure of the general control unit. The general control unit 55 includes a travel area obtaining unit 551. The travel area obtaining unit 551 receives from an SLAM unit 555 (described later) position information (described later) estimated by the SLAM unit 555, every predetermined time interval (e.g., every control period of the control unit 5) when executing the manual operation teaching mode.

The travel area obtaining unit 551 obtains a travel area TA indicating an area where the autonomous traveling device 100 travels in a travel environment, as a sequence of points of the obtained plurality of position information. The travel area obtaining unit 551 outputs to a travel area inside path creation unit 553 the sequence of points of the obtained plurality of position information, as a sequence of points indicating a peripheral boundary of the travel area TA.

In another preferred embodiment, the travel area obtaining unit 551 may cause the display 95 to display a global map GM (i.e., map information indicating the travel environment) that is created in advance. In this case, the travel area obtaining unit 551 may urge the operator to draw a closed area indicating the travel area TA on the global map GM displayed on the display 95.

Figure 7:
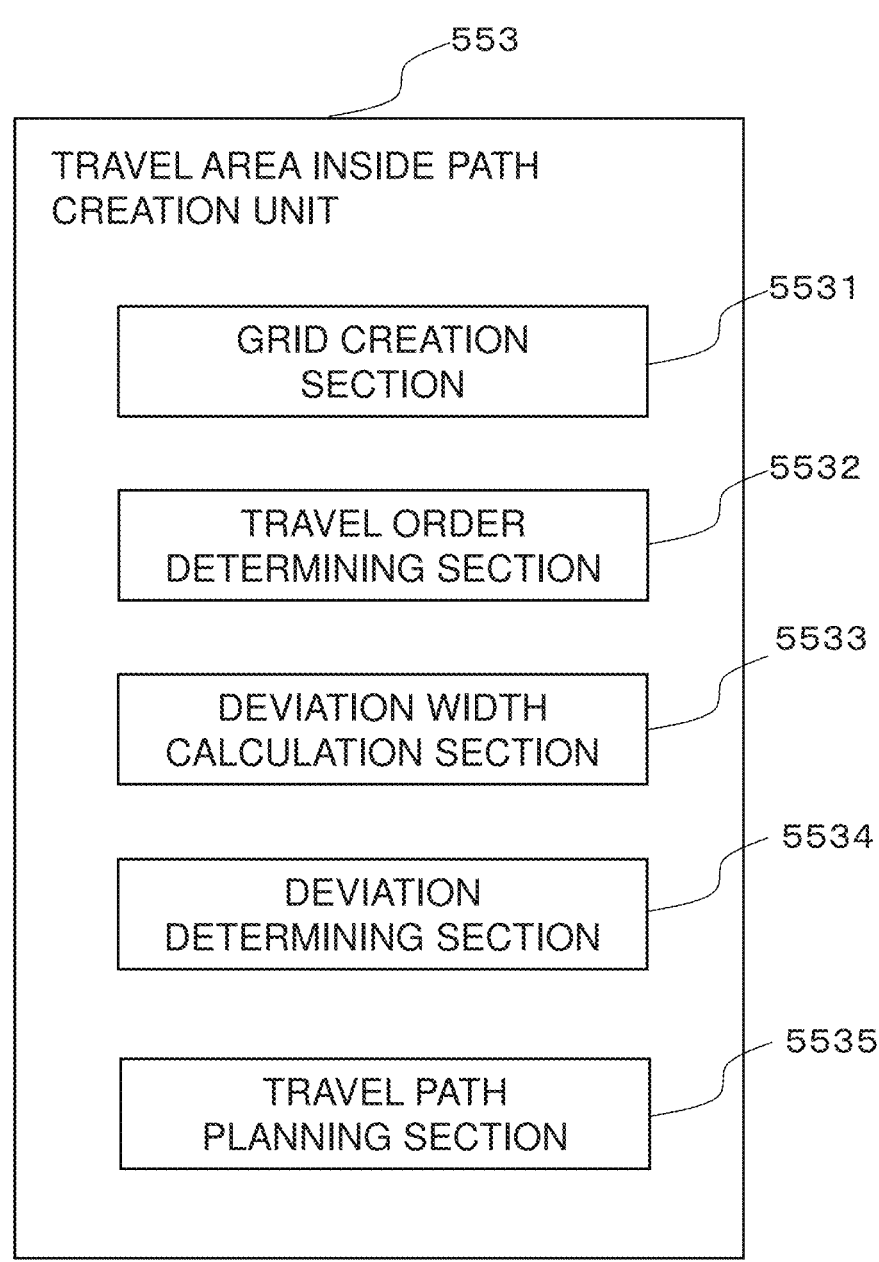
FIG. 7 is a diagram illustrating a detailed structure of a travel area inside path creation unit.

The general control unit 55 includes the travel area inside path creation unit 553 (an example of a path planning device). The travel area inside path creation unit 553 creates the traveling schedule 500 for the autonomous traveling device 100 to travel the travel area TA uniformly (so as to fill the same), in the travel area TA obtained from the travel area obtaining unit 551, and stores it in the storage unit 57. As illustrated in FIG. 7, the travel area inside path creation unit 553 includes a grid creation section 5531, a travel order determining section 5532, a deviation width calculation section 5533, a deviation determining section 5534, and a travel path planning section 5535.

The grid creation section 5531 partitions a target area to perform the filling travel in the global map GM, by grid cells of a predetermined size. Specifically, the grid creation section 5531 projects the global map GM onto a grid layer GL having coordinate axes different from those of the global map GM, so as to partition the target area by grid cells GR of a predetermined size on the grid layer GL. As the grid layer GL and the global map GM can be managed separately in this way, work efficiency is improved. Note that one or more of the target areas on the grid layer GL are set in the global map GM.

The travel order determining section 5532 determines a travelling order of the grid cells GR as travel targets. Note that the travelling order means order of the grid cells GR through which the autonomous traveling device 100 passes.

The travel path planning section 5535 plans a travel path to pass through selected grid cells as travel targets (as described later).

The general control unit 55 includes the SLAM unit 555. The SLAM unit 555 estimates information about position of the autonomous traveling device 100 on a predetermined coordinate (i.e. position information), based on information about an obstacle in front of the autonomous traveling device 100 obtained by the front detector 5551*a* (FIG. 1) disposed at the front portion of the main body B, and information about an obstacle in rear of the autonomous traveling device 100 obtained by the rear detector 5551*b* (FIG. 1) disposed at the rear portion of the main body B, and rotation amount of the travel motor 11 obtained by the encoder 111.

The front detector 5551*a* and the rear detector 5551*b* are laser range finders (LRF) having a detection range of 180 degrees or more, for example. If the laser range finder is used as the front detector 5551*a* and the rear detector 5551*b*, it obtains a distance between travel unit 1 and an obstacle and a direction to the obstacle, as the information about the obstacle.

The information obtained by the front detector 5551*a* and the rear detector 5551*b* may be two-dimensional information indicating position of the obstacle on a predetermined plane, or may be three-dimensional information further including position of the obstacle in the height direction.

The general control unit 55 includes a travel reproduction unit 557. When executing the autonomous travel mode, the travel reproduction unit 557 calculates a control command (the reproduction travel control command) for the autonomous traveling device 100 to autonomously travel the travel path indicated in the traveling schedule 500, based on the information stored in the traveling schedule 500 and the position information obtained from the SLAM unit 555. The travel reproduction unit 557 outputs the calculated reproduction travel control command to the travel control unit 53.

In another preferred embodiment, the travel reproduction unit 557 may output the cleaning conditions associated with the traveling schedule 500 to the cleaning control unit 51.

With reference to FIG. 6, a detailed structure of the SLAM unit 555 is described. The SLAM unit 555 in this preferred embodiment performs estimation of position (position information) of the travel unit 1 (autonomous traveling device 100) and creation of the map information, by using a simultaneous localization and mapping (SLAM) method.

The SLAM unit 555 includes a map creation section 5553. The map creation section 5553 creates the map information, by using information about a front obstacle (such as a wall) obtained by the front detector 5551*a* and information about a rear obstacle obtained by the rear detector 5551*b*. The map information is used when a position estimation section 5555 estimates the position information. As the map information, there are a local map and the global map GM (an example of an environmental map).

The local map is map information about (positions of) obstacles around the travel unit 1. The local map is created as necessary by coordinate conversion of the information about the front obstacle obtained by the front detector 5551*a* and the information about the rear obstacle obtained by the rear detector 5551*b*.

The global map GM is map information about (positions of) obstacles in an environment in which the travel unit 1 travels (i.e. the travel environment). In this preferred embodiment, the global map GM is created based on the local map obtained when the sequence of points of the position information indicating the travel area TA is obtained when executing the manual operation teaching mode to travel by operator's operation. In other words, the global map GM is created when the autonomous traveling device 100 performs teaching travel, and the target area to perform the filling travel is defined by travel locus when the teaching travel is performed.

Specifically, the map creation section 5553 creates the global map GM by allocating the local map, which is obtained together with the sequence of points of the position information indicating the travel area TA, at the position corresponding to the position information.

When obtaining the sequence of points of the position information indicating the travel area TA, there may be an error between the position information obtained at initial stage of the manual operation teaching mode and the position information obtained at end stage of the manual operation teaching mode. Specifically, for example, when obtaining the travel area TA that is a closed area as the sequence of points of the position information, the estimated position information of the travel unit 1 are not the same between start and end of the manual operation teaching mode, although the actual positions thereof are the same between them (i.e., so-called circular path problem).

In order to solve the above mismatch of the estimated position information, the map creation section 5553 corrects the global map GM created by allocating the local map at the corresponding position. Specifically, for example, the global map is corrected as follows.

First, the map creation section 5553 obtains information about the obstacle obtained by the front detector 5551*a* and/or information about the obstacle obtained by the rear detector 5551*b*, at start and end of the manual operation teaching mode.

Next, the map creation section 5553 calculates an actual position shift of the travel unit 1 between start and end of the manual operation teaching mode, based on difference between information about the obstacle obtained at a start of the manual operation teaching mode and information about the obstacle obtained at an end of the same, or the like.

After that, the map creation section 5553 corrects the position to allocate the local map based on the calculated actual position shift, using an algorithm such as Graph SLAM, and allocates the local map at the corrected new position, so as to create a new global map GM.

At this time, the map creation section 5553 may simultaneously correct position information (coordinate values) of the sequence of points indicating the travel area TA obtained by executing the manual operation teaching mode, by using the algorithm such as Graph SLAM, so as to use the corrected new sequence of points of the position information as the sequence of points indicating the travel area TA. By correcting the global map GM as described above, it is possible to create the global map GM indicating the travel environment more appropriately. In addition, when correcting the global map GM, by correcting the position information indicating the travel area TA, it is possible to obtain the sequence of points of the position information indicating the travel area TA as a closed area more appropriately.

In another preferred embodiment, the global map GM may be created and stored in the storage unit 57 by using dedicated software or a CAD. In this case, the global map created by the software or the like is converted into data readable by the control unit 5 of the travel unit 1.

The SLAM unit 555 includes the position estimation section 5555. The position estimation section 5555 estimates position information about position of the travel unit 1 on the predetermined coordinate and a direction of the travel unit 1 at the position, based on the global map created by the map creation section 5553, the local map, and rotation amount of the travel motor 11.

Specifically, the position information is estimated as follows. Here, as an example, suppose a case in which the travel unit 1 moves from a (estimated) position at predetermined time point (referred to as time point tk) to reach a position at next time point (referred to as time point tk+1), and the latter position is to be estimated.

First, the position estimation section 5555 calculates rotation amount of the main wheel 13 between time point tk and time point tk+1 from the number of pulses output from the encoder 111 between time point tk and time point tk+1, and estimates movement length and change of the direction of the travel unit 1 due to rotation of the main wheel 13 based on the rotation amount (dead reckoning).

Next, the position estimation section 5555 moves posterior probability at time point tk (corresponding to probability distribution indicating a relationship between the position of the travel unit 1 and a probability that the travel unit 1 exists at the position at time point tk) by a movement length and the change of the direction of the travel unit 1 due to rotation of the main wheel 13, so as to calculate prior probability at time point tk+1.

In another preferred embodiment, the position estimation section 5555 may increase the breadth of the probability distribution (standard deviation) of the posterior probability after moving by the movement length and the change of the direction due to rotation of the main wheel 13, so as to calculate the prior probability at time point tk+1. In this way, it is possible to calculate the prior probability considering slip between the main wheel 13 and the floor surface F.

After that, the position estimation section 5555 obtains the global map and the local map at time point tk+1 from the map creation section 5553, and performs map matching between the local map and the global map GM at time point tk+1, so as to estimate the position information of the travel unit 1 at time point tk+1.

Specifically, for example, on the global map GM, the local map at time point tk+1 is allocated at some positions near the estimated position calculated based on rotation amount of the main wheel 13, and the local map is rotated about the center thereof by an angle corresponding to a possible change of direction, and the map matching is performed. Based on a result of the map matching, the position estimation section 5555 calculates likelihood (corresponding to a relationship between a position at which the local map information is allocated and a matching degree between the global map GM and the local map information at the position).

After that, the position estimation section 5555 multiplies the likelihood by the prior probability at time point tk+1, so as to calculate the posterior probability at time point tk+1. The position estimation section 5555 estimates the position and the direction when the posterior probability at time point tk+1 becomes maximum, namely the position at which the travel unit 1 is estimated to exist with the highest probability and the direction that the travel unit 1 can have with the highest probability at the position, as the position of the travel unit 1 (estimated position) at time point tk+1 and the attitude (estimated attitude) at the position. The posterior probability at time point tk+1 is used as the prior probability in the next position estimation.

As described above, the position estimation section 5555 uses the movement length based on rotation amount of the main wheel 13 and map information obtained using the front detector 5551a and the rear detector 5551b, so as to perform position estimation. Thus, it is possible to perform accurate position estimation, by complementarily reducing an error included in the movement length based on rotation amount of the main wheel 13 (mainly due to slip between the main wheel 13 and the floor surface F), and an error included in the map information (mainly due to noise components included in the information obtained by the front detector 5551a and the rear detector 5551b).

The SLAM unit 555 includes an elapsed time determination section 5557. The elapsed time determination section 5557 determines elapsed time from start of executing the autonomous travel mode. Specifically, the elapsed time determination section 5557 determines an elapsed time from a start of executing the autonomous travel mode based on the position information estimated by the position estimation section 5555. More specifically, for example, a time associated with the position information closest to the position information of the travel unit 1 estimated by the position estimation section 5555, among position information stored in the traveling schedule 500, is determined as the elapsed time from a start of executing the autonomous travel mode.

Figure 8:
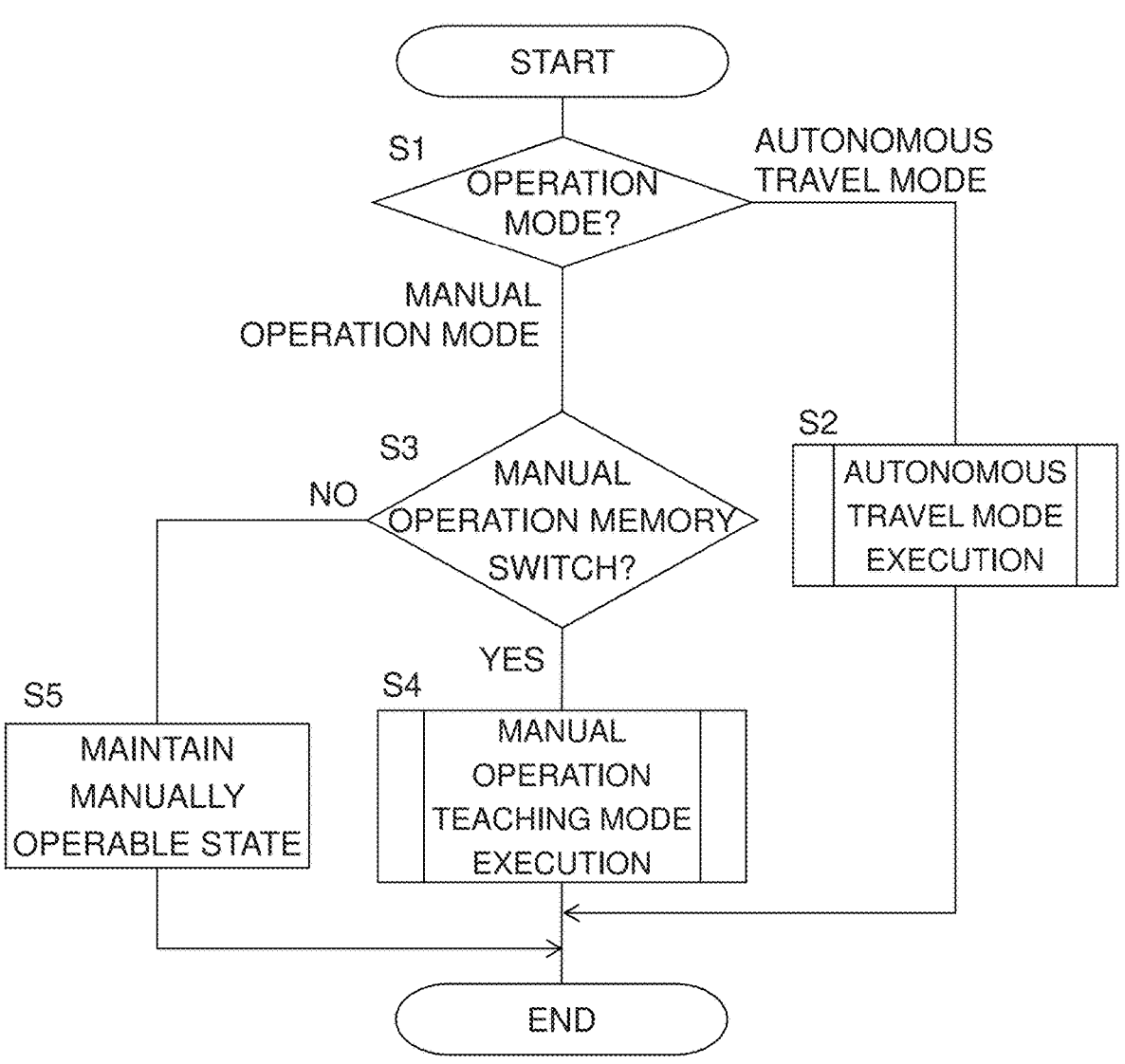
FIG. 8 is a flowchart illustrating a basic operation of the autonomous traveling device.

With reference to FIG. 8, a basic operation of the autonomous traveling device 100 is described. FIG. 8 is a flowchart illustrating a basic operation of the autonomous traveling device. After the autonomous traveling device 100 starts operation, in Step S1 the control unit 5 checks status of the selection unit 91. If "automatic" is selected by the selection unit 91 (in the case of the "autonomous travel mode"), the process proceeds to Step S2 in which the autonomous travel mode is executed. Specifically, the autonomous traveling device 100 autonomously performs the cleaning operation according to the traveling schedule 500 stored in the storage unit 57.

On the other hand, if "manual" is selected by the selection unit 91 (in the case of the "manual operation mode"), the control unit 5 determines that the operation mode to be executed is the manual operation mode.

In Step S3, it is checked whether or not pressing of the manual operation memory switch 92 is detected during the manual operation mode. If it is detected, the process proceeds to Step S4 in which the operation mode is changed to the manual operation teaching mode. As a result, operator's operations of the travel unit 1 are stored after the timing when the manual operation memory switch 92 is pressed.

In addition, in the manual operation teaching mode, the general control unit 55 creates the traveling schedule 500 for the autonomous traveling device 100 to travel in the travel area TA, as determined by the operator's operations of the travel unit 1.

On the other hand, if pressing of the manual operation memory switch 92 is not detected, the process proceeds to Step S5 to maintain the manual operation mode in which operator's operations are not stored.

In Step S4 described above, during execution of the manual operation teaching mode, the control unit 5 monitors whether or not the manual operation memory switch 92 is pressed. If the manual operation memory switch 92 is pressed during execution of the manual operation teaching mode, the operation mode is changed to the manual operation mode at the timing, and the cleaning operations after the timing are not stored in the traveling schedule 500. In other words, by pressing the manual operation memory switch 92 during execution of the manual operation teaching mode, the operator can stop the storing (teaching) at any timing during the cleaning operation.

As described above, the autonomous traveling device 100 according to this preferred embodiment can execute one of the autonomous travel mode, the manual operation mode, and the manual operation teaching mode, according to selection of the operation mode by the selection unit 91, and whether or not the manual operation memory switch 92 is pressed.

Figure 9:
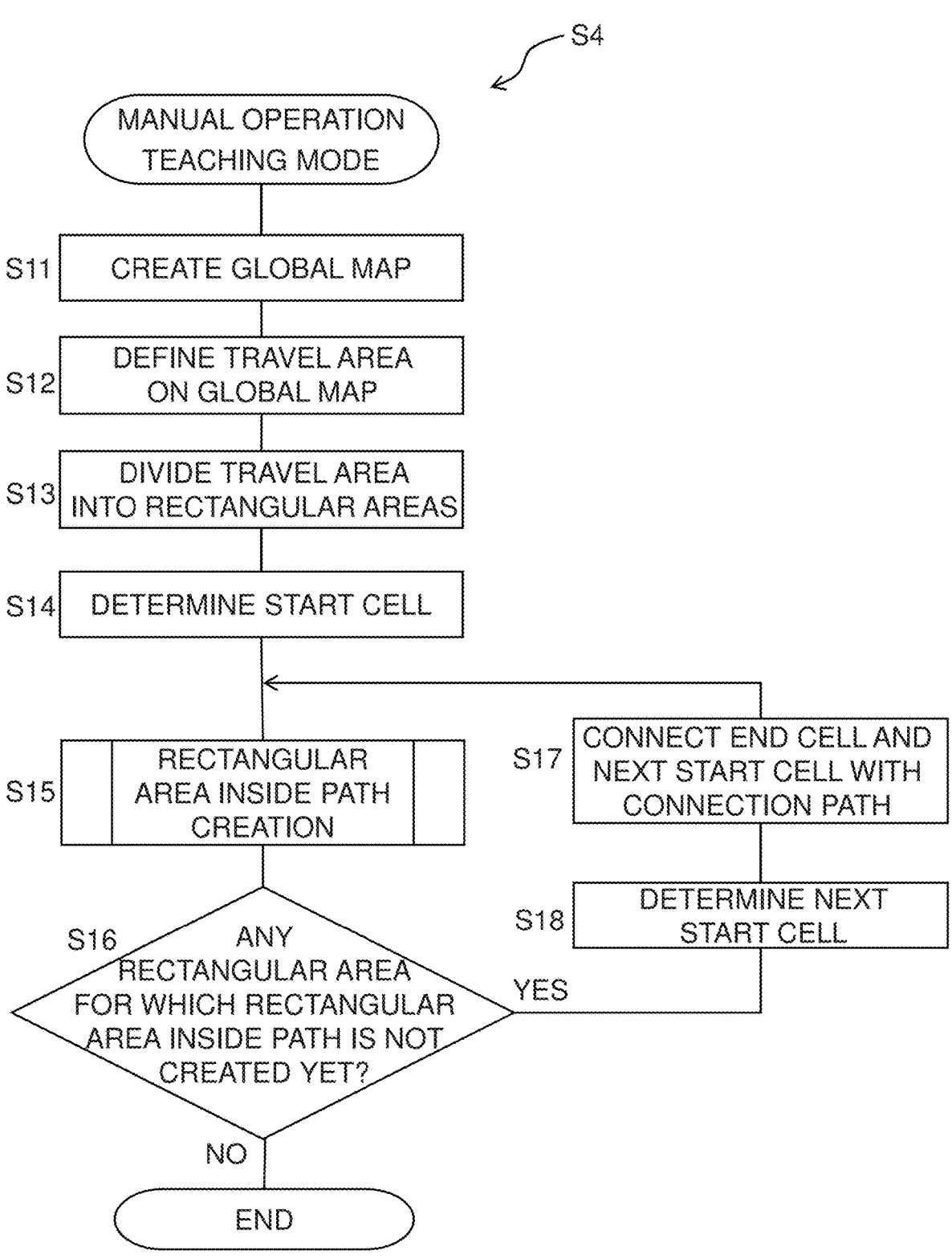
FIG. 9 is a flowchart illustrating an operation in a manual operation teaching mode.
Figure 10:
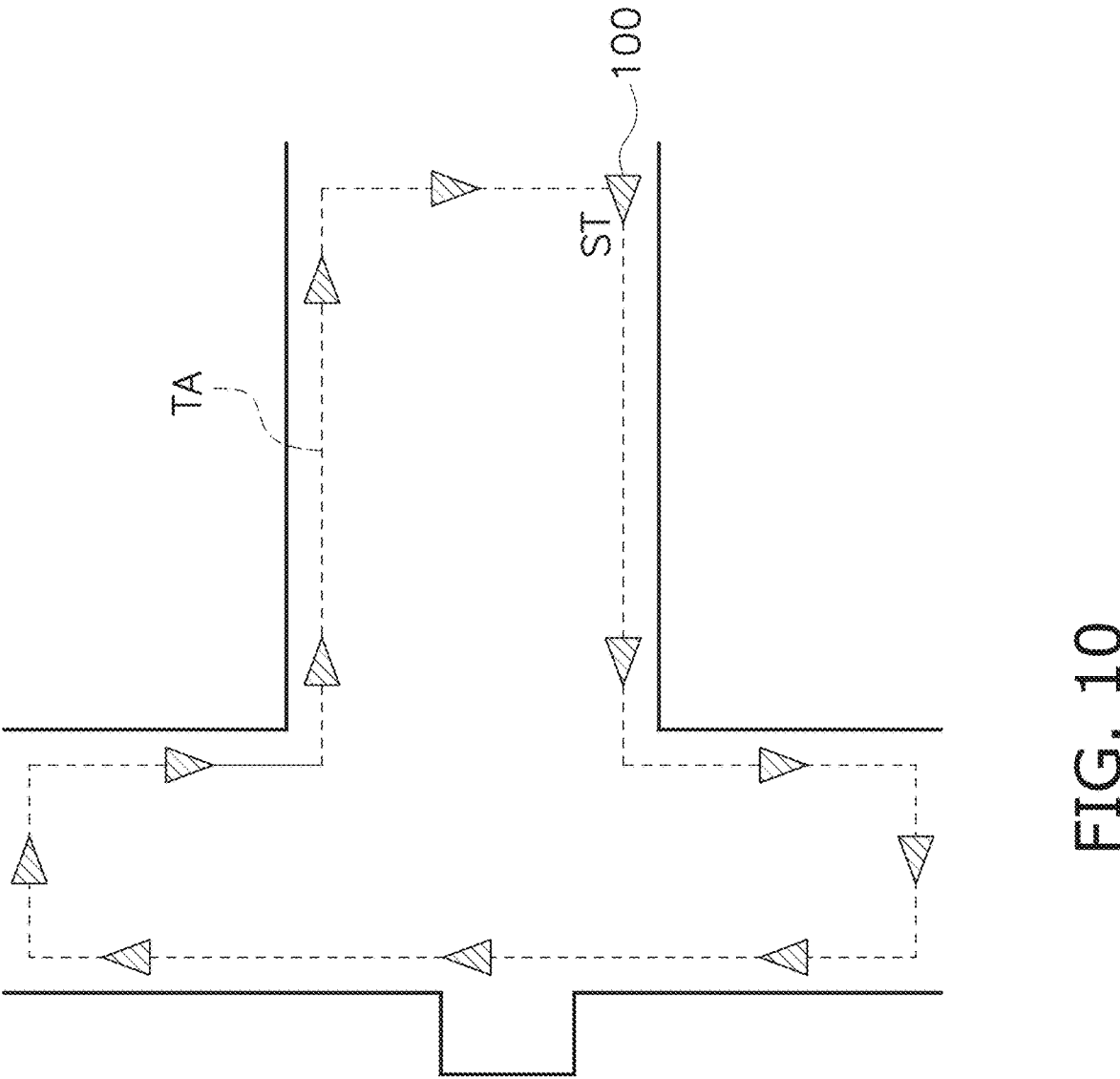
FIG. 10 is a diagram illustrating an example of a travel environment.
Figure 11:
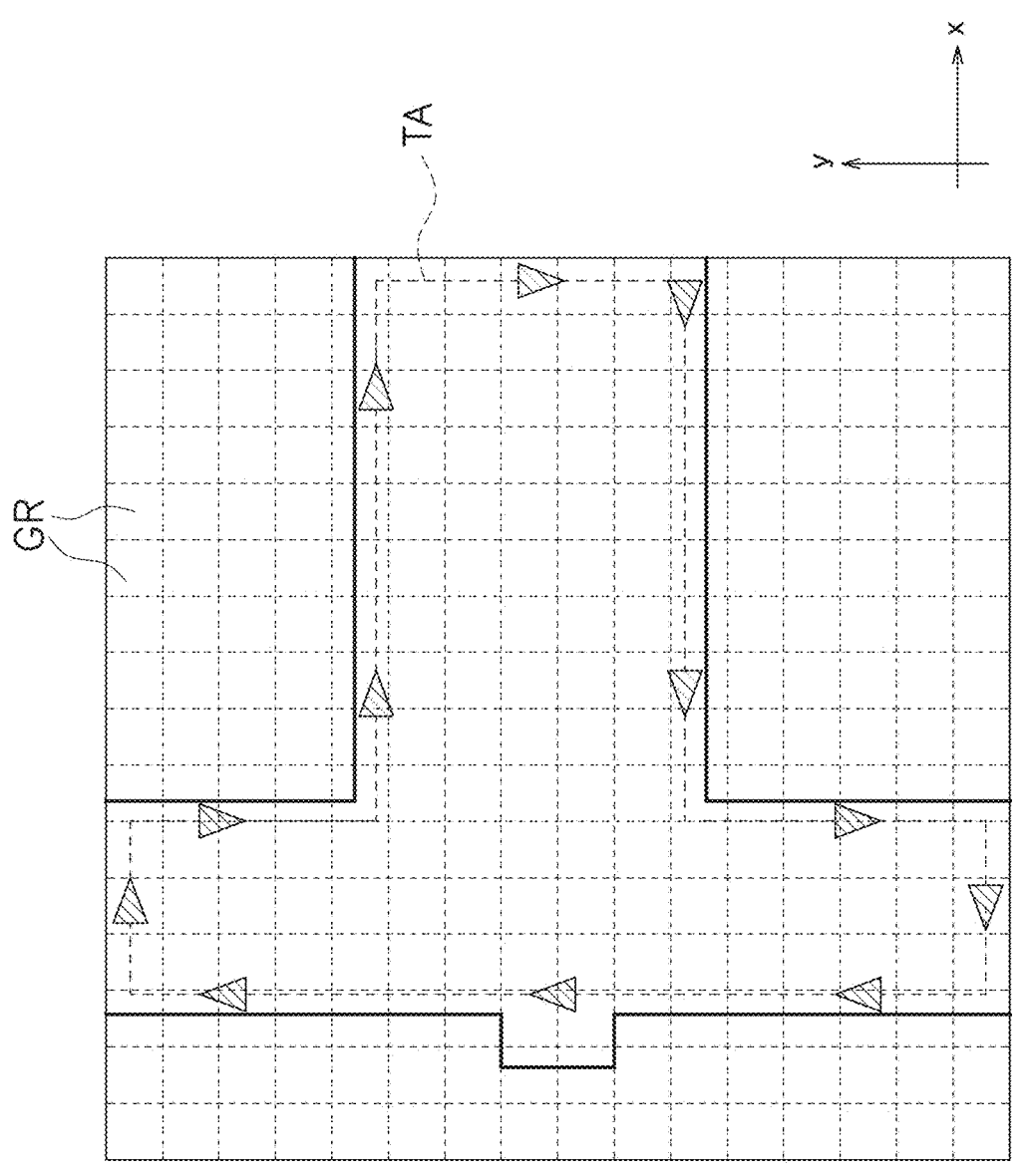
FIG. 11 is a diagram illustrating a state where a grid layer is projected onto a global map and further a travel area is overlaid.
Figure 12:
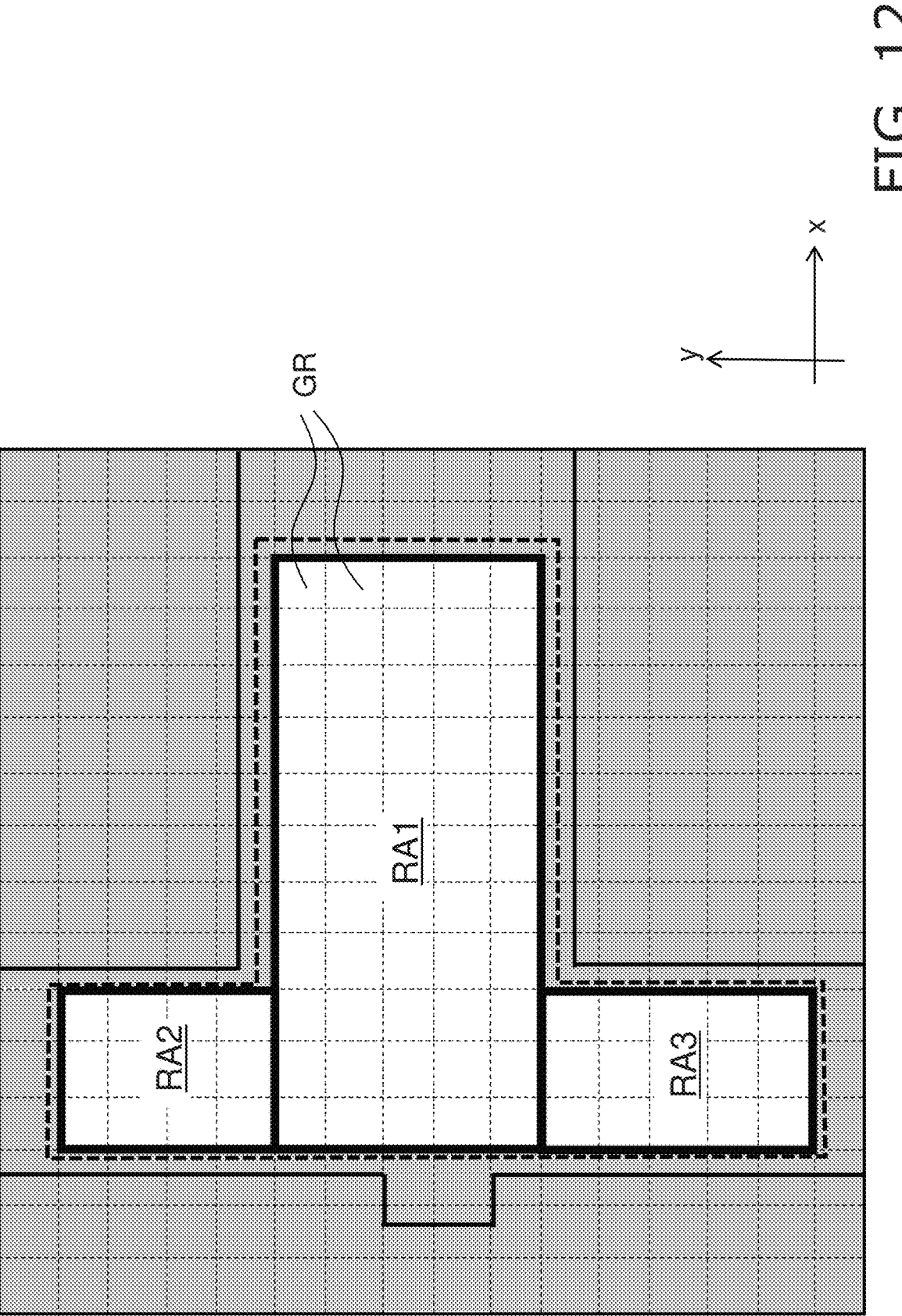
FIG. 12 is a diagram illustrating an example of a state in which the travel area is divided into rectangular areas.
Figure 13:
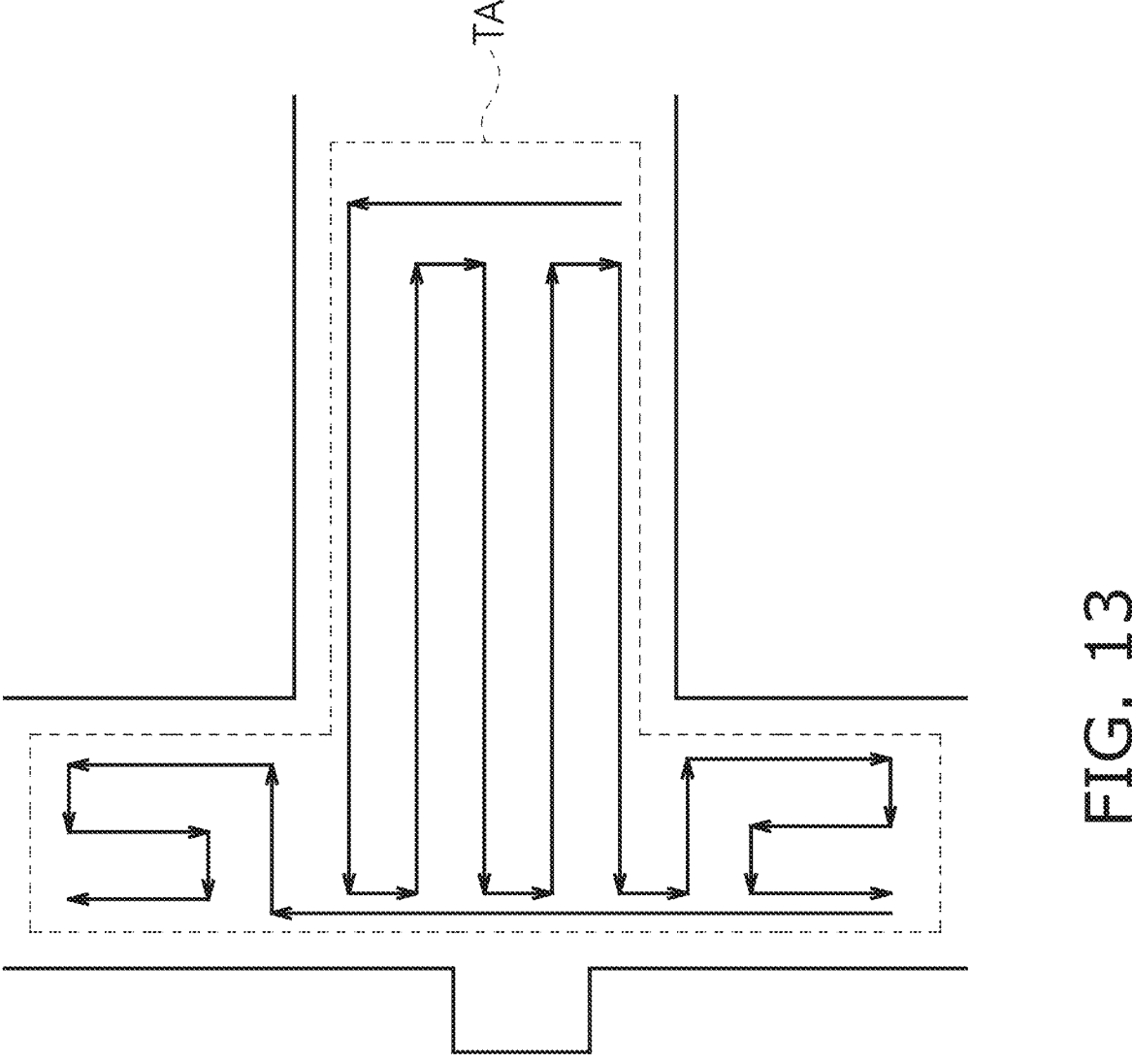
FIG. 13 is a diagram illustrating an example of the travel area inside path.

With reference to FIGS. 9 to 13, there is described an operation of the manual operation teaching mode executed in Step S4 described above. FIG. 9 is a flowchart illustrating an operation of the manual operation teaching mode. FIG. 10 illustrates an example of the travel environment. FIG. 11 is a diagram illustrating a state where the grid layer is projected onto the global map and further the travel area is overlaid. FIG. 12 is a diagram illustrating an example of a state in which the travel area is defined on the global map. FIG. 13 is a diagram illustrating an example of the travel area inside path. In the following description, the travel area inside path is planned so as to uniformly "fill" the travel area TA set in the travel environment as illustrated in FIG. 10, and the traveling schedule 500 is created.

In Step S11, when the traveling schedule 500 is created in the manual operation teaching mode, the general control unit 55 creates the global map GM indicating the travel environment.

First, when the manual operation of the autonomous traveling device 100 is started after the manual operation memory switch 92 is pressed, or when the manual operation memory switch 92 is pressed during the manual operation so as to start the manual operation teaching mode, the operator starts an operation of the autonomous traveling device 100 using the travel path teaching unit 7. The operator causes the autonomous traveling device 100 to travel along the peripheral boundary of the travel area TA.

While the autonomous traveling device 100 travels by the operator's operation, the map creation section 5553 obtains the local map every predetermined time interval. As illustrated in FIG. 10, the autonomous traveling device 100 starts traveling at a start point ST, travels a closed path as the peripheral boundary of the travel area TA, and returns to the start point ST or vicinity thereof. After that, the map creation section 5553 allocates the obtained local maps to corresponding positions so as to create the global map GM. After that, the map creation section 5553 corrects the global map GM as necessary using the Graph SLAM algorithm or the like.

On the other hand, the grid layer GL corresponding to the global map GM is prepared. The grid layer GL is appropriately created by the grid creation section 5531. The grid layer GL is an aggregate of many grid cells GR. The grid cell GR corresponds to a small region having a predetermined area in the travel environment. The grid size is 50×50 cm, for example. Using the grid layer GL having coordinate axes different from those of the global map GM in this way, they can be managed separately, and hence work efficiency can be improved.

In addition, in the computer system of the control unit the grid cells GR can be defined as a "structure" having parameters regarding to the grid cell (such as a parameter for discriminating the grid cell GR, position information of the grid cell GR, valid or invalid of the grid cell GR, or a score assigned to the grid cell GR), for example.

In Step S12, after creating the global map GM, the travel area TA indicating an area for the autonomous traveling device 100 to travel in the travel environment is defined on the global map GM. Specifically, the travel area TA is defined on the global map GM as described below.

First, during execution of Step S11 described above, namely while causing the autonomous traveling device 100 to travel along the peripheral boundary of the travel area TA, the travel area obtaining unit 551 obtains the position information estimated by the position estimation section 5555 every predetermined time interval, as points indicating the peripheral boundary of the travel area TA.

In this way, the travel area obtaining unit 551 can obtain the sequence of points indicating the peripheral boundary of the travel area TA, which is a plurality of position information obtained by the autonomous traveling device 100, while it travels from the start point ST (FIG. 10) along the path shown by the broken line, and returns to the start point ST or vicinity thereof. The travel area obtaining unit 551 outputs the sequence of points of the position information indicating the peripheral boundary of the travel area TA to the travel area inside path creation unit 553.

Next, as illustrated in FIG. 11, the travel area inside path creation unit 553 allocates the sequence of points indicating the peripheral boundary of the travel area TA on the global map GM (in reality, on the grid layer GL). Which grid cell on the grid layer GL the position information indicating the peripheral boundary of the travel area TA is allocated to can be determined based on which coordinate value the grid GR exists in the coordinate system defining the position information (the global map), for example.

After that, as illustrated in FIG. 12, the travel area inside path creation unit 553 determines that the grid cells GR in the travel area TA (white color grid cells in FIG. 12) and the grid cells on which the sequence of points of the travel area TA exists (white color grid cells in FIG. 12) are valid grid cells, and determines that other grid cells GR are invalid grid cells (gray color grid cells in FIG. 12).

In this way, the travel area inside path creation unit 553 newly determines the grid cells GR that are not included in the travel area TA to be the invalid grid cells, and hence can define the travel area TA as an area including many valid grid cells (white color grid cells GR in FIG. 12) on the global map GM.

After defining the travel area TA on the global map GM, in Step S13 the travel area inside path creation unit 553 divides the travel area TA into areas of a rectangular shape (rectangular areas RA). When dividing the travel area TA into the rectangular areas RA, the travel area inside path creation unit 553 checks a portion of the travel area TA in which the rectangular area RA exists.

After dividing the travel area TA into rectangular areas RA1 to RA3, in Step S14 the travel area inside path creation unit 553 determines a start grid cell of the rectangular area inside path (described later) in each of the rectangular areas RA1 to RA3, for each of the rectangular areas RA1 to RA3. The start grid cells of other rectangular areas RA2 and RA3 are determined in Step S17 as described later.

In Step S15, the travel area inside path creation unit 553 creates the rectangular area inside path that starts from the start grid cell and passes through all the valid grid cells included in the target rectangular area RA1 to RA3.

In Step S16, the travel area inside path creation unit 553 determines whether or not there is any rectangular area RA1 to RA3 for which the rectangular area inside path is not created. If there is no rectangular area RA1 to RA3 for which the rectangular area inside path is not created yet, the manual operation teaching mode is finished.

In contrast, if there is any rectangular area RA1 to RA3 for which the rectangular area inside path is not created, in Step S17 the rectangular area RA2 or RA3 in which the autonomous traveling device 100 travels next is determined.

In Step S18, the travel area inside path creation unit 553 creates a travel path (connection travel path) that connects an end grid cell of the rectangular area RA1 and the start grid cell of the rectangular area RA3 determined to travel next.

After that, Steps S15 to S18 described above are executed repeatedly until the rectangular area inside path is created for all the rectangular areas RA1 to RA3. As a result, the travel area inside path is finally created for the autonomous traveling device 100 to uniformly travel the set travel area TA as illustrated by the thick arrow lines in FIG. 13, for the travel area TA illustrated in FIG. 12 or the like.

After creating the travel area inside path, the travel area inside path creation unit 553 converts the created travel area inside path into a set of passing points (e.g., sub goals) for the autonomous traveling device 100 to pass (as described later). After that, the travel area inside path creation unit 553 associates each of the passing points generated by conversion of the travel area inside path with a time point at which each passing point is passed, and further associates cleaning conditions at each passing point with the corresponding passing point, as necessary. Thus, the traveling schedule 500 is created.

In the manual operation teaching mode, by executing Steps S11 to S18 described above, it is possible to accurately create the travel path for the autonomous traveling device 100 to uniformly travel the travel area TA, namely the travel area inside path, by an easy method to specify the travel area TA on the global map GM indicating the travel environment.

Figure 14:
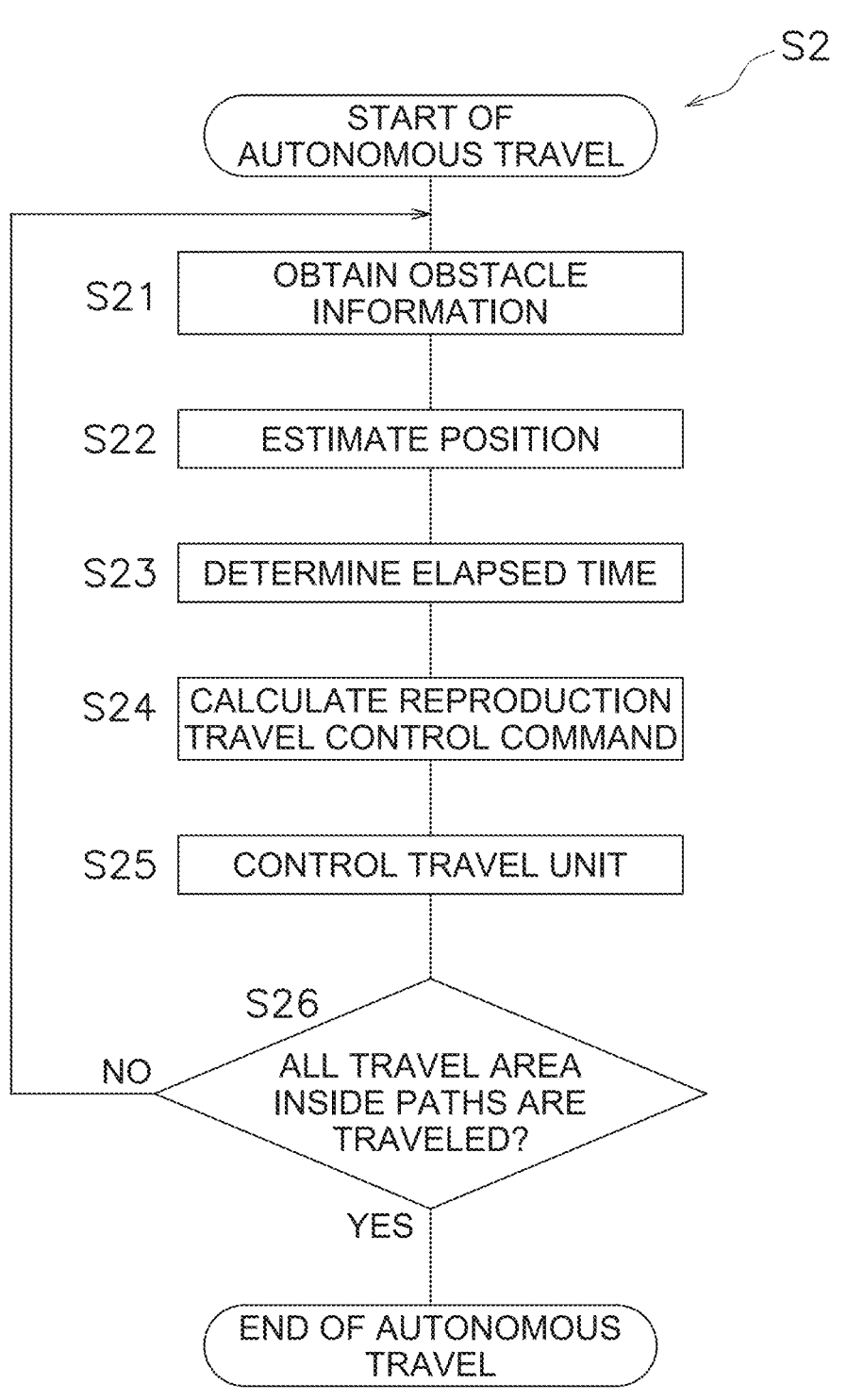
FIG. 14 is a flowchart illustrating an operation of the autonomous traveling device when executing an autonomous travel mode.

With reference to FIG. 14, there is described an operation of the autonomous traveling device 100 when executing the autonomous travel mode executed in Step S2 of FIG. 8, so as to reproduce the travel area inside path created in the manual operation teaching mode. FIG. 14 is a flowchart illustrating the operation of the autonomous traveling device when executing the autonomous travel mode.

When "automatic" is selected by the selection unit 91 so as to execute the autonomous travel mode, the autonomous traveling device 100 starts the autonomous travel mode to perform autonomous travel according to the traveling schedule 500. Specifically, the autonomous travel mode is executed as follows.

In the following description, it is supposed that travelling after start of executing the autonomous travel mode until elapsed time tm−1 has been performed. Here, m indicates m-th travel control.

In Step S21, the SLAM unit 555 obtains information about a front obstacle and information about a rear obstacle from the front detector 5551a and the rear detector 5551b.

In Step S22, the position estimation section 5555 estimates position of the travel unit 1 on the x-y coordinate, based on rotation amount of the travel motor 11 measured by the encoder 111, the global map GM, and the local map obtained based on the information obtained in Step S21. For instance, it is supposed that position of the autonomous traveling device 100 is estimated to be (xm', ym', θm') on the x-y coordinate.

In Step S23, after the position of the travel unit 1 is estimated, the elapsed time determination section 5557 determines elapsed time tm from start of executing the autonomous travel mode.

In Step S24, the travel reproduction unit 557 calculates the reproduction travel control command at the elapsed time tm as described below.

It is supposed that the elapsed time tm is determined to be time TL stored in the traveling schedule 500 (or to be closest to the time TL). In this case, the travel reproduction unit 557 reads position information (xL+1, yL+1, θL+1) associated with next time TL+1 from the traveling schedule 500, and calculates the reproduction travel control command at the elapsed time tm based on a difference (xL+1−xm', yL+1−ym', θL+1−θm') between the estimated position information and target position information.

In Step S25, after the reproduction travel control command is calculated, the travel reproduction unit 557 outputs the reproduction travel control command to the travel control unit 53. In this way, the travel control unit 53 controls the travel motor 11 based on the received reproduction travel control command, so as to cause the travel unit 1 to autonomously move according to the traveling schedule 500.

In another preferred embodiment, if the cleaning conditions are associated with the traveling schedule 500, the travel reproduction unit 557 may calculate the reproduction cleaning conditions and control the cleaning control unit 51 based on the reproduction cleaning conditions in Steps S24 and S25 described above.

Specifically, the travel reproduction unit 557 reads the cleaning conditions (SL, WL, PL) associated with the time TL from the traveling schedule 500, and determines the cleaning conditions (SL, WL, PL) to be the reproduction cleaning conditions at the elapsed time tm. After that, the travel reproduction unit 557 outputs the reproduction cleaning conditions to the cleaning control unit 51. In this way, it can control the cleaning unit 3 according to the reproduction cleaning conditions.

In Step S26, after controlling the travel unit 1 according to the reproduction travel control command, the travel reproduction unit 557 checks whether or not all traveling operations stored in the traveling schedule 500 are performed. Whether or not all traveling operations stored in the traveling schedule 500 are performed can be checked by detecting an identifier at the end of the traveling schedule 500 (such as an identifier indicating "end of file"), for example.

As long as it is determined that all traveling operations stored in the traveling schedule 500 are not performed ("No" in Step S26), Steps S21 to S25 described above are repeatedly executed.

On the other hand, if it is determined that all traveling operations stored in the traveling schedule 500 are performed, i.e., if it is determined that the autonomous traveling device 100 has traveled all the travel area inside path ("Yes" in Step S26), execution of the autonomous travel mode is finished. In this way, the autonomous traveling device 100 can faithfully reproduce the traveling operation stored in the traveling schedule 500, so as to autonomously and uniformly travel the set travel area.

In another preferred embodiment, execution of the autonomous travel mode may be stopped not only in the case where all traveling operations stored in the traveling schedule 500 are performed, but also in the case where an abnormality has occurred in the autonomous traveling device 100, or the case where the user issues a command to stop execution of the autonomous travel mode, or other cases, for example.

Figure 15:
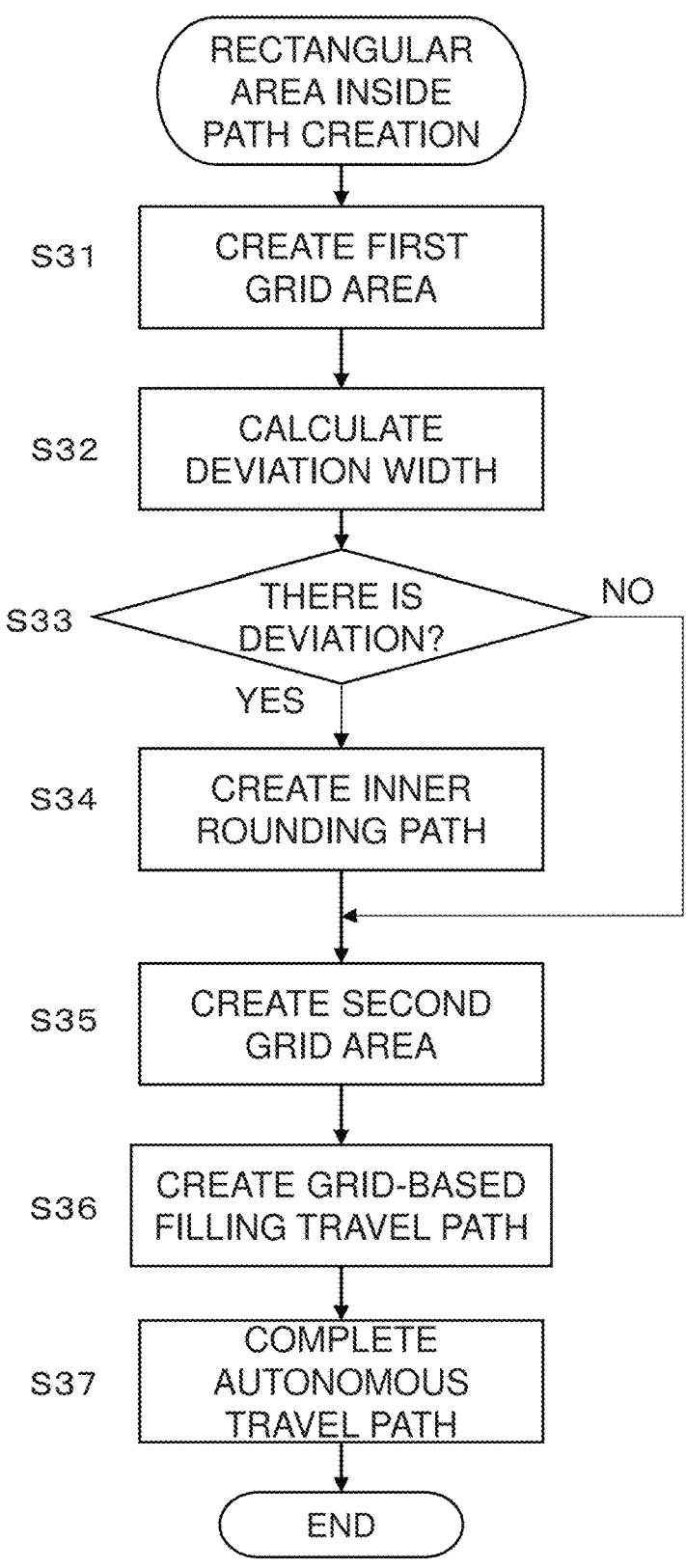
FIG. 15 is a flowchart illustrating an operation of rectangular area inside path creation control.
Figure 16:
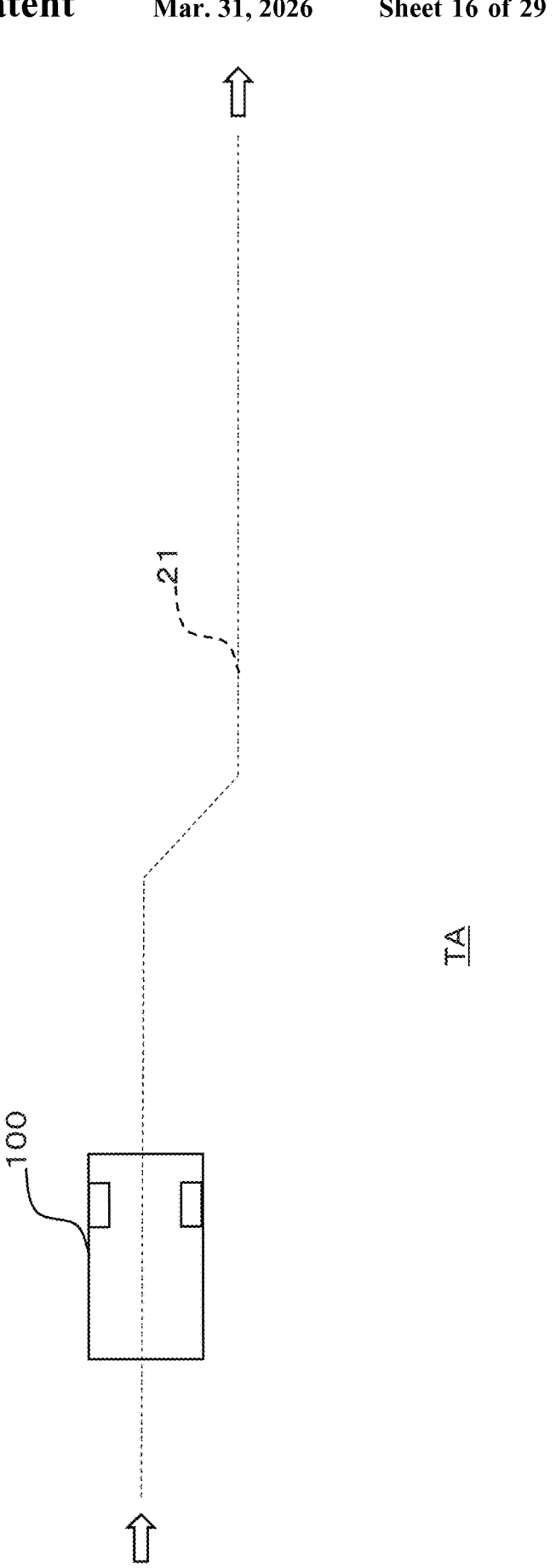
FIG. 16 is a schematic plan view illustrating a relationship among an outer rounding path, a first grid area, a second grid area, an inner rounding path, and a filling travel path.
Figure 17:
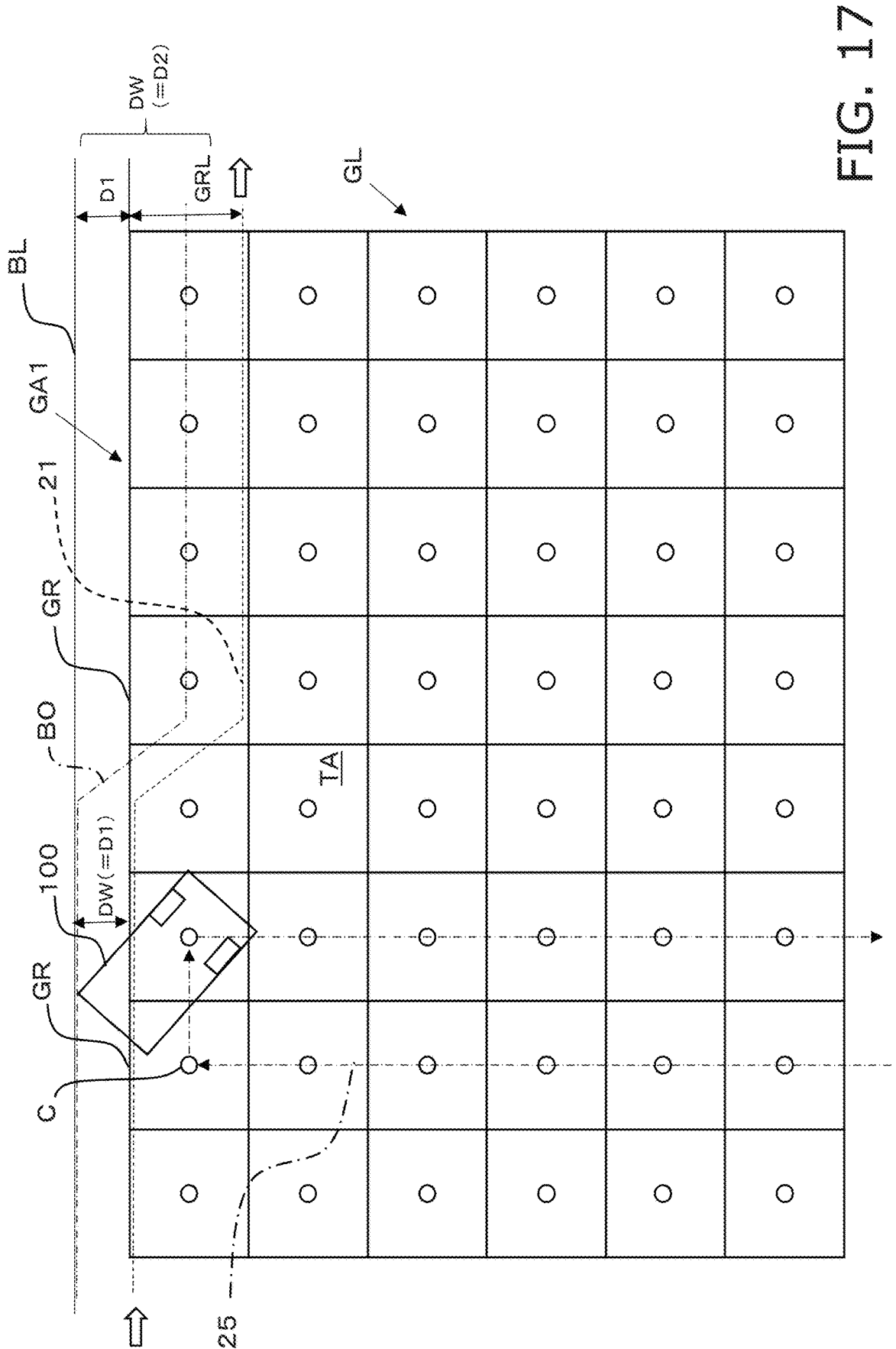
FIG. 17 is a schematic plan view illustrating a relationship among the outer rounding path, the first grid area, the second grid area, the inner rounding path, and the filling travel path.
Figure 18:
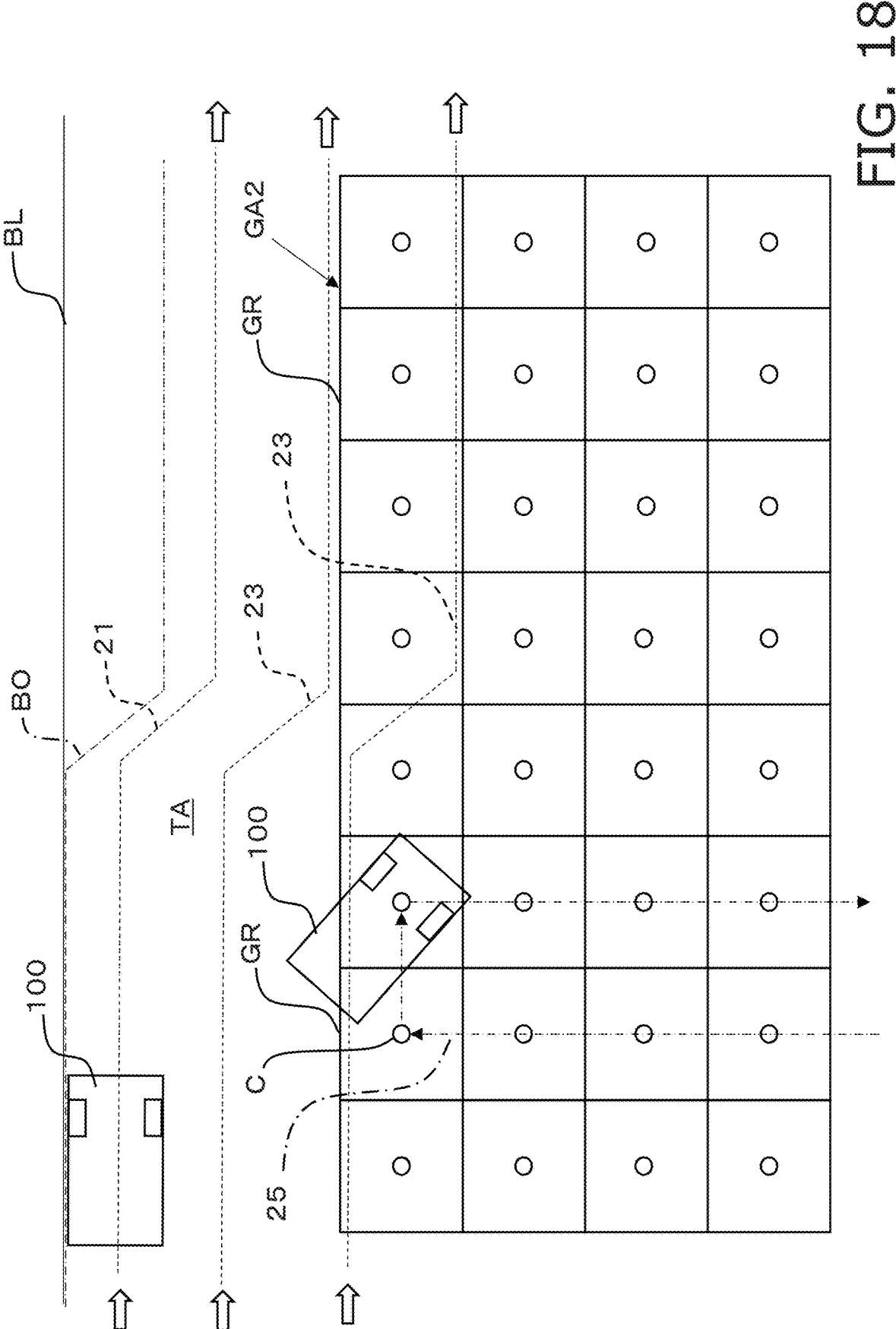
FIG. 18 is a schematic plan view illustrating a relationship among the outer rounding path, the first grid area, the second grid area, the inner rounding path, and the filling travel path.

As a variation of the manual operation teaching mode described above with reference to FIGS. 9 to 13, a control operation of rectangular area inside path creation is described with reference to FIGS. 15 to 18. Note that the following description corresponds to Step S15 in FIG. 9. FIG. 15 is a flowchart illustrating the control operation of rectangular area inside path creation. FIGS. 16 to 18 are schematic plan views illustrating a relationship among an outer periphery teaching path, a first grid area, a second grid area, an inner rounding path, and a filling travel path.

The global map GM is obtained when the autonomous traveling device 100 performs outer periphery teaching travel. For instance, FIG. 16 illustrates an outer rounding path 21 by the autonomous traveling device 100, and the lower side of the outer rounding path 21 is the travel area TA. Note that the outer rounding path 21 is a path that goes around the outer periphery from the outer periphery teaching start position. This is not a grid path but a path planned by free path planning based on the outer periphery teaching path (an actual travel locus when the teaching travel is performed). Note that in this example, the outer periphery teaching path is used as the outer rounding path 21 without modification.

In a variation, the outer rounding path is created from the outer periphery teaching path. For instance, the travel area is specified on a GUI (i.e., the outer periphery teaching path is created), and next the outer rounding path is created based on the taught outer periphery. In this way, the autonomous traveling device 100 can travel smoothly.

The control operation of the rectangular area inside path creation is an autonomous travel path planning method of planning a path for the autonomous traveling device 100 to autonomously travel, and includes the following steps.

In Step S31, a first grid area GA1 is created corresponding to the travel area TA. At this time, the grid layer GL described above is used. Specifically, the grid creation section 5531 (an example of a grid creation section) of the travel area inside path creation unit 553 determines a first rectangle including the outer periphery teaching path, for example, and next determines a second rectangle that is larger by a margin than the first rectangle, and next allocates a first grid cell GR at a position where the grid cell center is the same as that of the second rectangle, and finally a plurality of the grid cells GR are spread all over to the position including the second rectangle. In this way, the first grid area GA1 is generated. For instance, the first grid area GA1 is illustrated in FIG. 17. Here, in the first grid area GA1, the outermost grid cells GR cover the outer rounding path 21.

Note that the first grid area GA1 is formed independently of the travel area TA. The first grid area GA1 is formed to protrude from the travel area TA. In addition, the first grid area GA1 may be formed by invalidating a portion of grid cells on the grid layer GL and validating the other grid cells.

In Step S32, a deviation width DW is calculated, which is a deviation of the main body B of the autonomous traveling device 100 from the outer rounding path 21 when the autonomous traveling device 100 changes its direction, based on a body size of the autonomous traveling device 100, turning radius thereof, turning movement distance, and grid size. Specifically, the deviation width calculation section 5533 performs the above calculation. For instance, FIG. 17 illustrates the deviation width DW (distance to maximum deviation area boundary BL) when the autonomous traveling device 100 deviates from the outer rounding path 21 due to direction change. The deviation width DW differs depending on position, and in this preferred embodiment it is within a range between minimum deviation amount D1 and maximum deviation amount D2 (i.e., the minimum deviation amount D1 plus grid cell length GRL).

In Step S33, it is determined whether or not there was deviation. Specifically, the deviation determining section 5534 performs the above determination. If there was deviation, the process proceeds to Step S34. If there was no deviation, the process skips Step S34 and proceeds to Step S35.

In Step S34, an inner rounding path 23 is created. Specifically, the travel path planning section 5535 (an example of an inner rounding path creation unit) creates the inner rounding path 23. The inner rounding path 23 is a path positioned inside the outer rounding path 21 by a grid cell width (a reduced path of the outer rounding path 21), and they are parallel to each other. The inner rounding path 23 is created by free path planning based on the outer rounding path 21. For instance, FIG. 18 illustrates two inner rounding paths 23 extending in parallel. However, the distance between the two inner rounding paths 23 may not be the grid cell width, but it may be partly different and partly the same. Note that the inner rounding path 23 may be created by free path planning based on the outer periphery teaching path. In addition, the inner rounding path 23 may be processed by reducing and smoothing the outer rounding path 21.

Note that in this step, there is calculated the maximum number of the inner rounding paths 23 necessary for preventing an occurrence of an unfilled place. In other words, although a size of the deviation width DW may differ depending place, by creating the inner rounding paths 23 of the maximum number necessary to cover the deviation width DW, it is possible to plan the travel path that does not cause an unfilled place.

In Step S35, a second grid area GA2 (an example of a grid area) is created. The second grid area GA2 is a target area for which the filling travel path is planned. The second grid area GA2 is created using the innermost inner rounding path 23 and the first grid area GA1. Specifically, the grid cells GR in the first grid area GA1 that include the innermost inner rounding path 23 or that are inside thereof are determined to be the grid cells GR in the second grid area GA2. In other words, the second grid area GA2 is generated by invalidating a portion of the first grid areas GA1 and validating the other portion.

Note that as a variation, the grid cells GR in the first grid area GA1 that have the center C inside the innermost inner rounding path 23 or that are inside thereof may be determined to be the grid cells GR in the second grid area GA2.

In Step S36, a filling travel path 25 is created so as to fill the second grid area GA2. Specifically, the travel path planning section 5535 (an example of a filling travel path creation unit) creates the filling travel path 25. First, a travelling order of the grid cells GR on the grid layer GL is determined, and next a grid path passing through the centers C of the grid cells GR is created.

For instance, FIG. 18 illustrates a portion of the filling travel path 25. In this case, when the autonomous traveling device 100 changes its direction in the second grid area GA2, the autonomous traveling device 100 deviates from the second grid area GA2 as illustrated in the diagram, but the deviation portion is positioned inside the outermost inner rounding path 23.

Note that in Step S36, the filling travel path 25 may be formed to fill not only the second grid area GA2 but also the deviation width DW. In this case, in a condition where the grid cells are located to straddle a boundary of the outer periphery teaching path, grid cell location on the boundary, i.e. an actual boundary shape of the second grid area GA2 becomes linear, and hence linear filling travel paths having high efficiency are tend to be planned.

In Step S37, the outer rounding path 21 after the outer periphery teaching travel, the inner rounding path 23, and the filling travel paths 25 are continuously connected. Specifically, the travel path planning section 5535 performs the above determination. As a result, the autonomous travel path is completed.

In the above description, the start position of the filling travel path 25 is set on the outer rounding path 21. In this way, the end position of the filling travel path 25 becomes clear, and retrieval of the autonomous traveling device 100 becomes easy. In addition, as the end position of the filling travel path becomes explicit to the user, a start position of teaching to be realized next is determined, for example, and hence the autonomous traveling device 100 can smoothly and continuously travel.

More specifically, in this case, the end position of the filling travel path 25 is set close (approximately a few tens centimeters) to the start position inside the outer rounding path 21. As the end position is set at a position shifted inward from the start position, deviation from a teaching range can be prevented when planning the filling travel path 25 to return to the end position (i.e. the start position) on the outer rounding path 21. In contrast, if the start position equal to the end position, when planning a moving and returning path to the end position (i.e. the start position) on the outer rounding path 21, the deviation described above is assumed to occur depending on shape of the travel unit 1 of the autonomous traveling device 100.

As described above, the inner rounding path 23 to travel the deviation width DW is created, and next the second grid area GA2 is created, and further the filling travel path 25 is created in the second grid area GA2. As a result, the autonomous travel path is planned so that the autonomous traveling device 100 can travel without deviation from a peripheral boundary BO of the travel area TA in a grid-based autonomous travel path.

Note that a single inner rounding path 23 or a plurality of the inner rounding paths 23 may be created. If a plurality of the inner rounding paths 23 are created, they may be independent of each other or a portion of them may be overlapped. The plurality of the inner rounding paths 23 may be parallel to each other, or some or all of them may be not parallel to each other. In addition, the number of the inner rounding paths 23 may be a predetermined fixed value.

Figure 19:
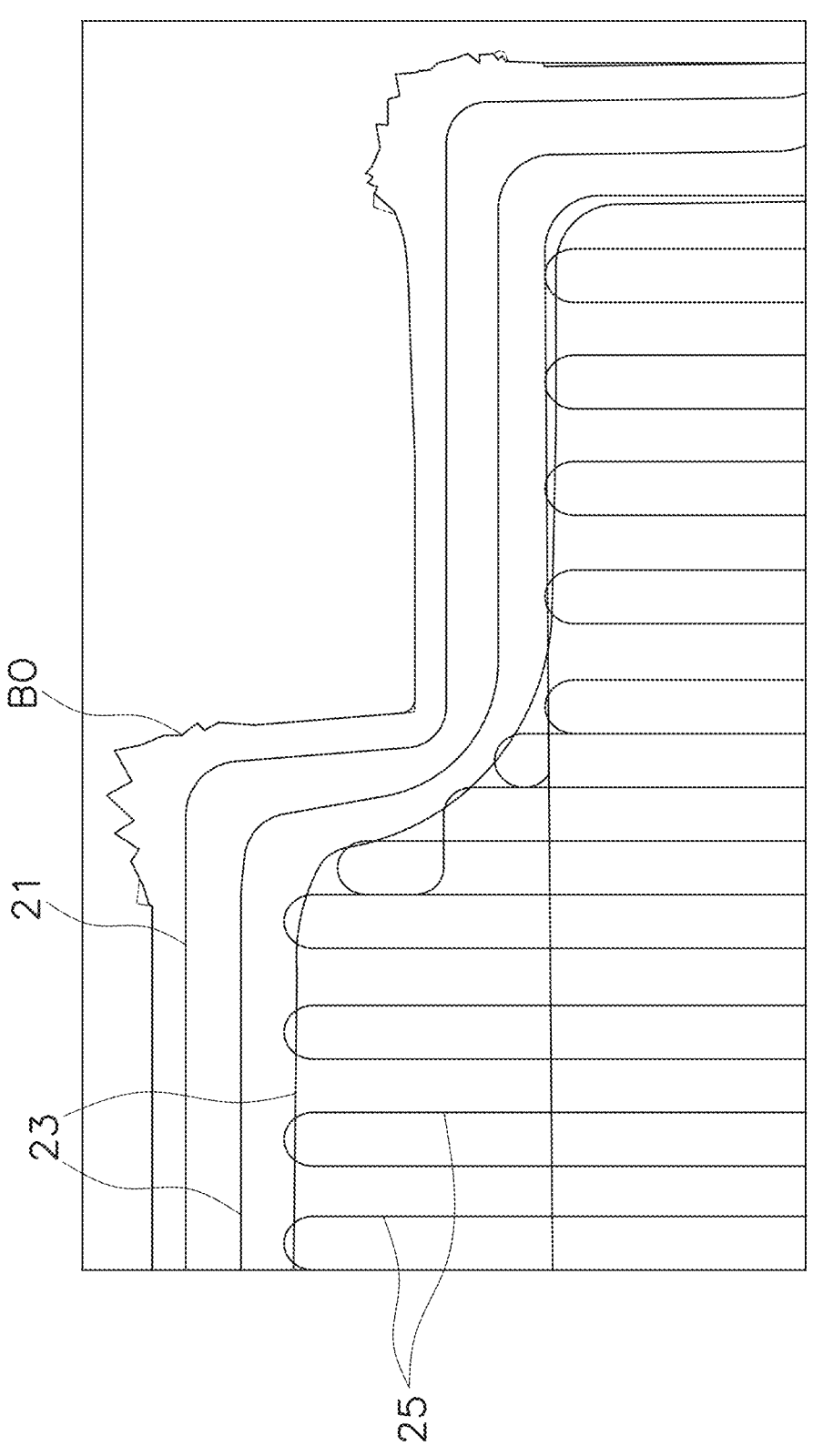
FIG. 19 is an environmental map showing the travel path in the first preferred embodiment of the present invention.
Figure 20:
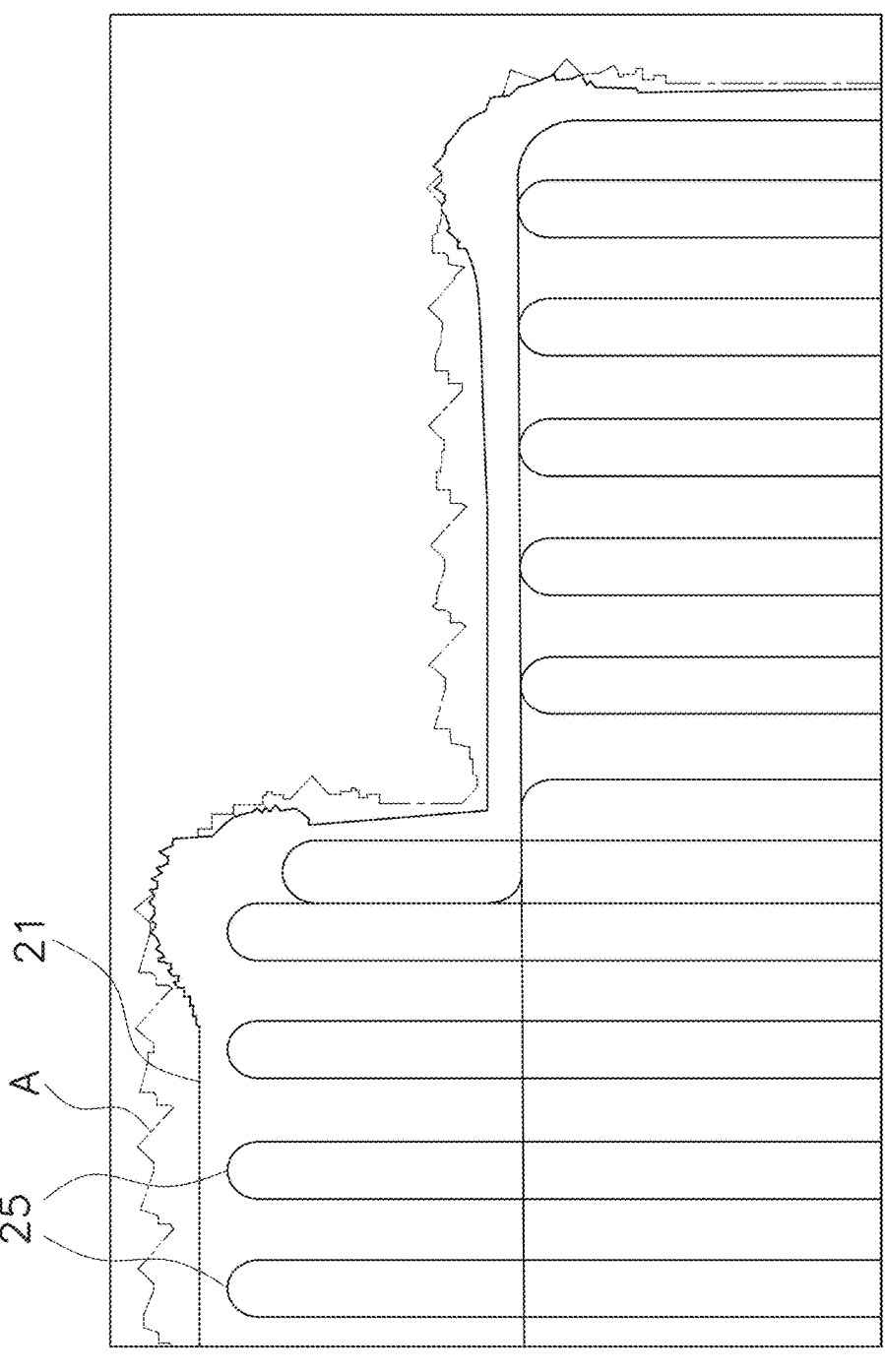
FIG. 20 is an environmental map showing the travel path in a conventional example.

With reference to FIGS. 19 and 20, an actual travel path formed on the global map (environmental map) is described. FIG. 19 illustrates the environmental map on which the travel path is shown in the first preferred embodiment. FIG. 20 illustrates the environmental map on which the travel path is shown in a conventional example. In FIG. 19, according to this preferred embodiment, there are the peripheral boundary BO, the outer rounding path 21, the two inner rounding paths 23, and the filling travel path 25. In FIG. 20, according to the conventional example, there are the outer rounding path 21 and the filling travel path 25. In FIG. 20, the area A shown by the double-dot-dashed line is an area in which the autonomous traveling device 100 travels due to direction change of the filling travel path 25, and is deviated outward from the outer rounding path 21.

2. Second Preferred Embodiment

In the first preferred embodiment, before the inner rounding path creation and the second grid area creation, the first grid area is created. However, the first grid area creation (Step S31 in FIG. 15) may be omitted. In other words, even if the first grid area is not created in the first preferred embodiment, it is sufficient that the following steps are executed so as to form the second grid area GA2 (an example of a grid area, corresponding to the second grid area GA2 in the first preferred embodiment).

Hereinafter, there is described a control operation in which Step S31 is eliminated from the flowchart of FIG. 15 of the first preferred embodiment.

In Step S32, there is calculated the deviation width DW of the main body B of the autonomous traveling device 100 from the outer rounding path 21 when the autonomous traveling device 100 changes its direction, based on a body size of the autonomous traveling device 100, a turning radius thereof, a turning movement distance, and a grid size. Specifically, the deviation width calculation section 5533 performs the above calculation.

In Step S33, it is determined whether or not there was deviation. Specifically, the deviation determining section 5534 performs the above determination. If there is deviation, the process proceeds to Step S34. If there is no deviation, the process skips Step S34 and proceeds to Step S35.

In Step S34, one or more inner rounding paths 23 corresponding to at least a portion of the deviation are created. Specifically, the travel path planning section 5535 (an example of an inner rounding path creation unit) creates the inner rounding path 23. The inner rounding path 23 is a path positioned inside the outer rounding path 21 by the grid cell width (a reduced path of the outer rounding path 21), and they are parallel to each other. The inner rounding path 23 is created by free path planning based on the outer rounding path 21.

In Step S35, the second grid area GA2 is created. The second grid area GA2 is a target area for which the filling travel path is planned. Specifically, the grid creation section 5531 (an example of the grid creation section) of the travel area inside path creation unit 553 creates the second grid area GA2 by invalidating a portion of the grid cells on the grid layer GL and validating the other grid cells, for example.

More specifically, the second grid area GA2 is created using the innermost inner rounding path. In other words, the second grid area GA2 is formed in such a manner that the innermost inner rounding path 23 is in the outermost grid cells GR. Note that as a variation, the second grid area GA2 may be formed in such a manner that the innermost inner rounding path 23 is inner than the centers C of the outermost grid cells GR. The description of Steps S36 and S37 is the same as in the first preferred embodiment, and hence the explanation of these steps is omitted.

3. Third Preferred Embodiment

Conventionally, if environmental change occurs in the filling travel, the travel is stopped so as to prevent the autonomous traveling device from losing its own position on the way and being unable to follow the planned travel path. Note that the environmental change is a position movement (including addition and elimination) of the obstacle recorded on the environmental map in the teaching and the obstacle detected by the sensor in the autonomous travel, for example.

In this case, it is necessary to reteach the travel range and recreate the path for an unfilled place thereafter, including a vicinity of the stop position. A problem of the above technique is that an unfilled place (e.g., an uncleaned area) occurs after the stop position, and reteaching is necessary in order to cause the autonomous traveling device to perform the filling travel of the area, resulting in waste of filling travel time (cleaning time) necessary until detection of the environmental change. Therefore, it is preferred to detect the environmental change as early as possible to inform the user thereof.

Figure 21:
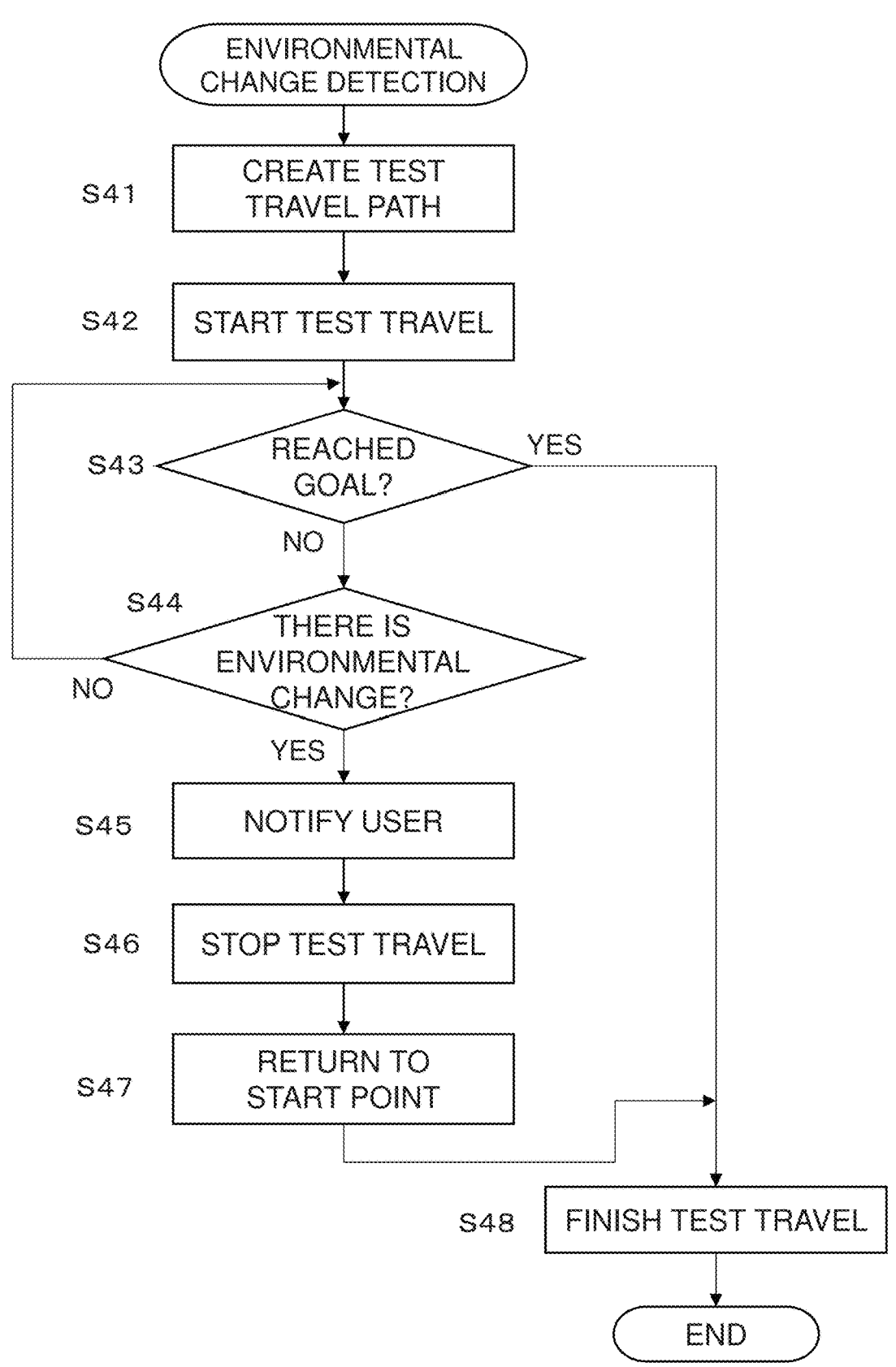
FIG. 21 is a flowchart illustrating operations of test travel path creation and test travel control in a third preferred embodiment of the present invention.

In order to solve the above problem, in this preferred embodiment, a test travel to detect an environmental change is performed prior to the filling travel, so as to detect an environmental change before performing the filling travel and enable to inform the user. Therefore, unlike the conventional method, the autonomous travel time before detecting environmental change is not wasted. Note that this preferred embodiment can be performed not only after creating the autonomous travel path in the first preferred embodiment but also before creating the same. Even before creating the autonomous travel path, the test travel path can be planned after obtaining the travel area. Hereinafter, with reference to FIG. 21, the environmental change detection control operation is further described in detail. FIG. 21 is a flowchart illustrating the test travel path creation and the test travel control operation according to a third preferred embodiment.

After the autonomous travel path is planned, the environmental change detection operation is started by a designation method (such as UI) by which the user can explicitly select the test travel, for example. Note that in a case of an outer periphery direct teaching method, the test travel may be performed automatically if interval between any time point between start and end of teaching and start time point of the filling travel is longer than a predetermined time.

Figure 22:
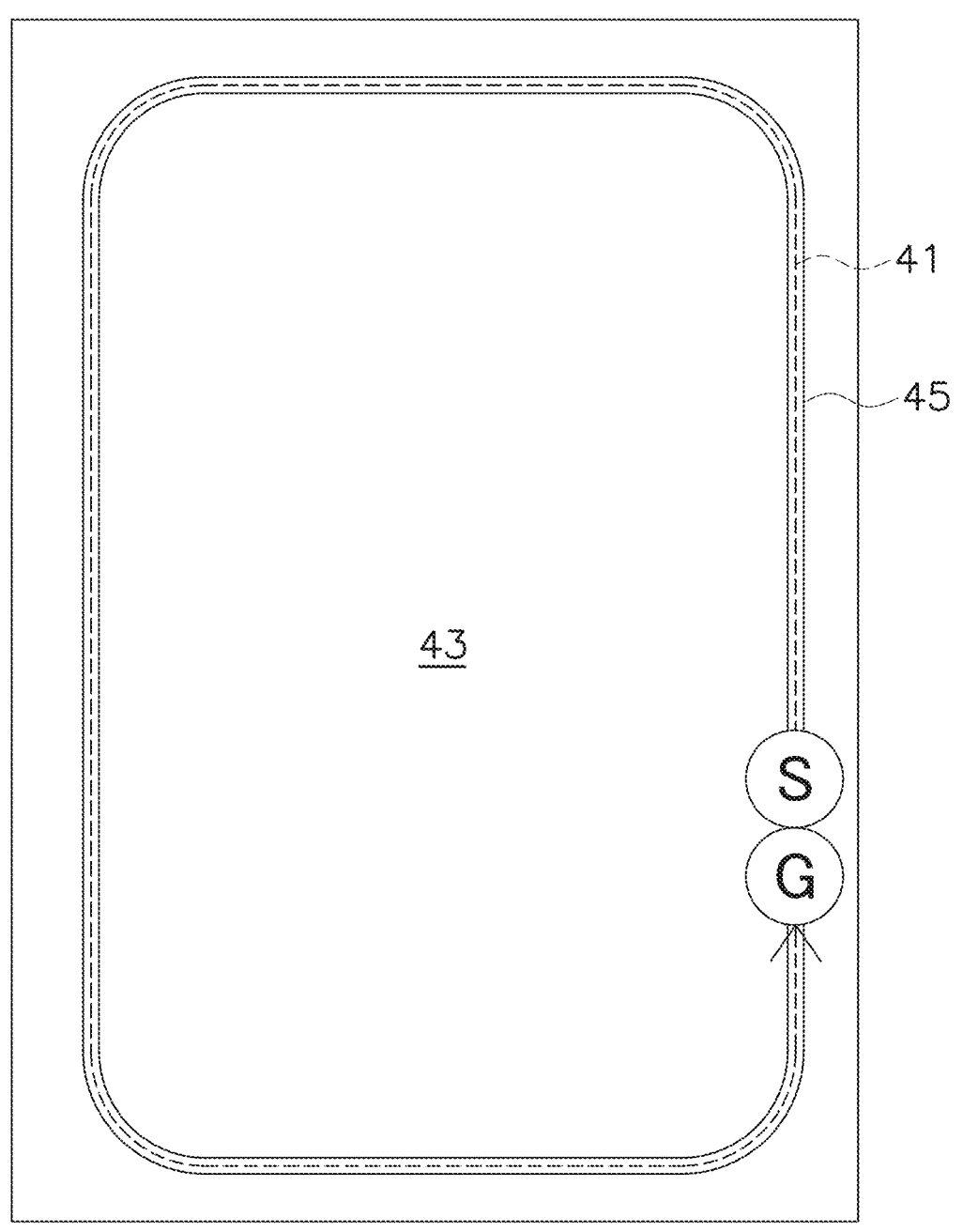
FIG. 22 is a schematic plan view of a test travel path.

In Step S41, a test travel path 41 to detect an environmental change is created. Specifically, the travel area inside path creation unit 553 creates the test travel path 41. As illustrated in FIG. 22, the test travel path 41 coincides with an outer rounding path 45 in a whole area 43. In this case, test travel time described later is shortened. FIG. 22 is a schematic plan view of the test travel path.

In the test travel, the following steps are performed.

In Step S42, the autonomous traveling device 100 starts the test travel path. Specifically, the travel control unit 53 performs the above operation.

In Step S43, it is determined whether or not the autonomous traveling device 100 has reached a goal G. Specifically, the general control unit 55 checks a status based on detection information from sensors (such as information about an obstacle in front of the autonomous traveling device 100 obtained by the front detector 5551a, and information about an obstacle in rear of the autonomous traveling device 100 obtained by the rear detector 5551b). If it has not reached the goal G, the process proceeds to Step S44. If it has reached the goal G, the process proceeds to Step S48.

In Step S44, it is determined whether or not there is an environmental change during the test travel. Specifically, the general control unit 55 performs the above determination as an environmental change determination unit, based on detection information from sensors. If there is an environmental change, the process proceeds to Step S45. If there is no environmental change, the process returns to Step S43. In this way, until the autonomous traveling device 100 reaches the goal G, it is normally checked whether or not there is an environmental change.

In Step S45, the environmental change detected during the test travel is notified to the user. Specifically, a notification unit (not shown) performs the notification. The notification provided when an environmental change is detected can be a screen display, sound, light, or email. In this way, the user can promptly be informed of the environmental change. In Step S46, the test travel is stopped. Specifically, the travel control unit 53 performs the above operation.

In Step S47, the autonomous traveling device 100 returns to a start point S. Specifically, the travel control unit 53 performs the above operation. In this way, the user can quickly start the reteaching.

Note that the route to return to the start point S may be a route to move oppositely along the current path to return to the start point S (or vicinity thereof), or may be a route to move along the shortest path to return to the start point S. The former route enables safe return to the start point S without any environmental change. The latter route has a shorter returning time. Note that the autonomous traveling device 100 may be returned to any point on the test travel path without limiting to the start point of the test travel.

After that, the process proceeds to Step S48. In Step S48, the test travel is finished. After that, the filling travel is performed.

Note that as a variation, instead of the step of returning to the start point S (Step S47), it may be possible to perform the step of stopping at the position or the step of continuing the test travel. In another variation, it may be possible not to start the filling travel if there is an environmental change. In still another variation, it may be possible to perform cleaning also while performing the test travel.

Note that, if a filling area is divided, the test travel may be performed in each area. In this case, when detecting a change for the first time, it may be possible to perform one of or all of notification of the environmental change, stopping the test travel, returning the autonomous traveling device 100 to the start point of the test travel, and the like. Otherwise, it may be possible not to perform any of them but to perform the test travel until the final area. In addition, it may be possible to perform cleaning for an area where no environmental change is detected.

Note that if an environmental change is detected, after completing the test travel, after stopping the test travel, or after returning to the start position of the test travel, or instead of the operation thereof, it may be possible to move the autonomous traveling device 100 to a point in the travel area, such as the start position or the end position of the autonomous filing travel. In addition, in the case where the user does not explicitly select the test travel but the test travel is automatically performed prior to the autonomous filing travel, if no environmental change is detected, it is preferred to automatically perform the filling travel, but it may be possible that the user determines to start the filling travel as confirmation.

Figure 23:
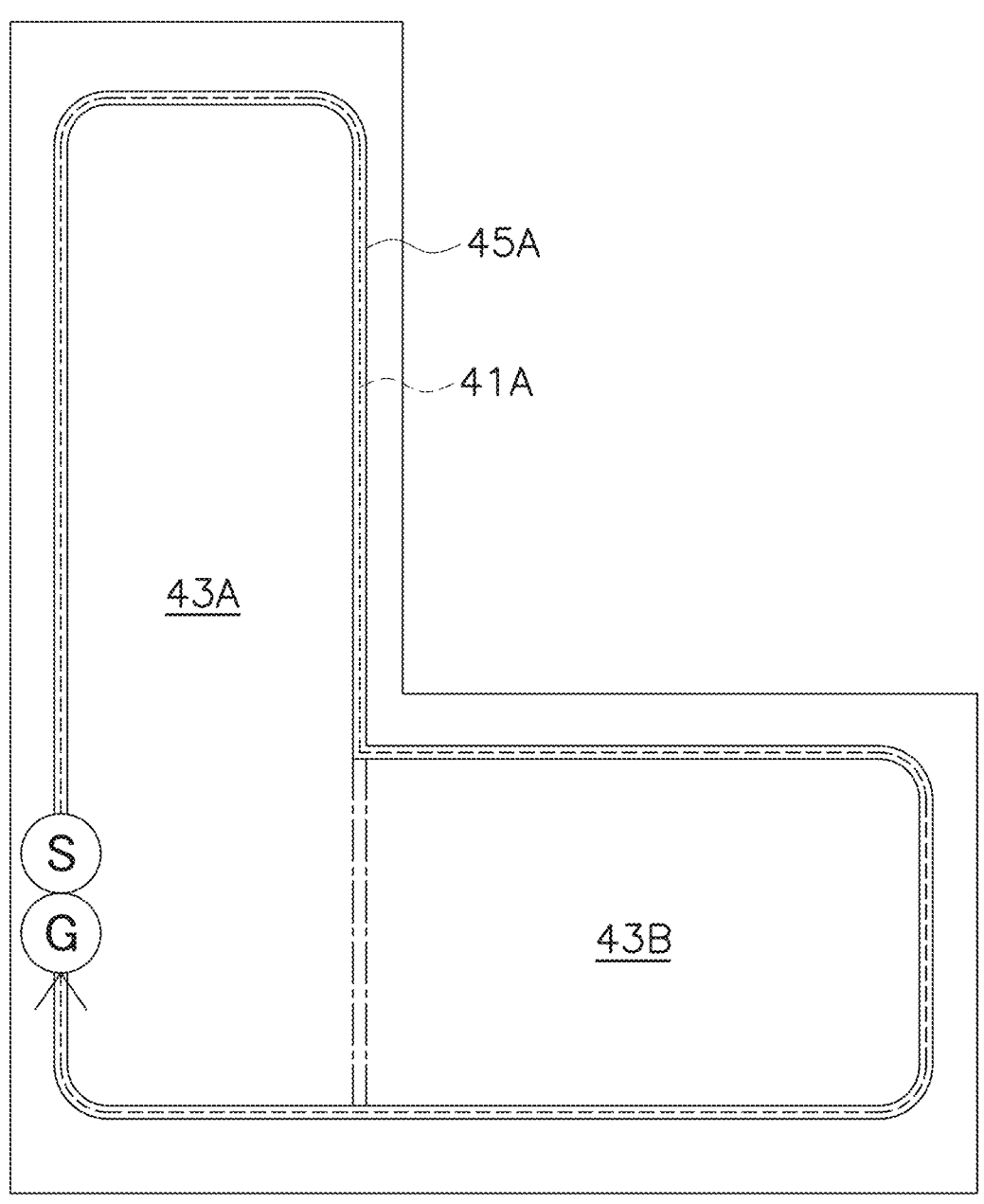
FIG. 23 is a schematic plan view of the test travel path according to a first variation of a preferred embodiment of the present invention.

In a first variation, if the area is divided into two areas as illustrated in FIG. 23, a test travel path 41A coincides with an outer rounding path 45A that goes around the outer periphery of the whole area 43.

Figure 24:
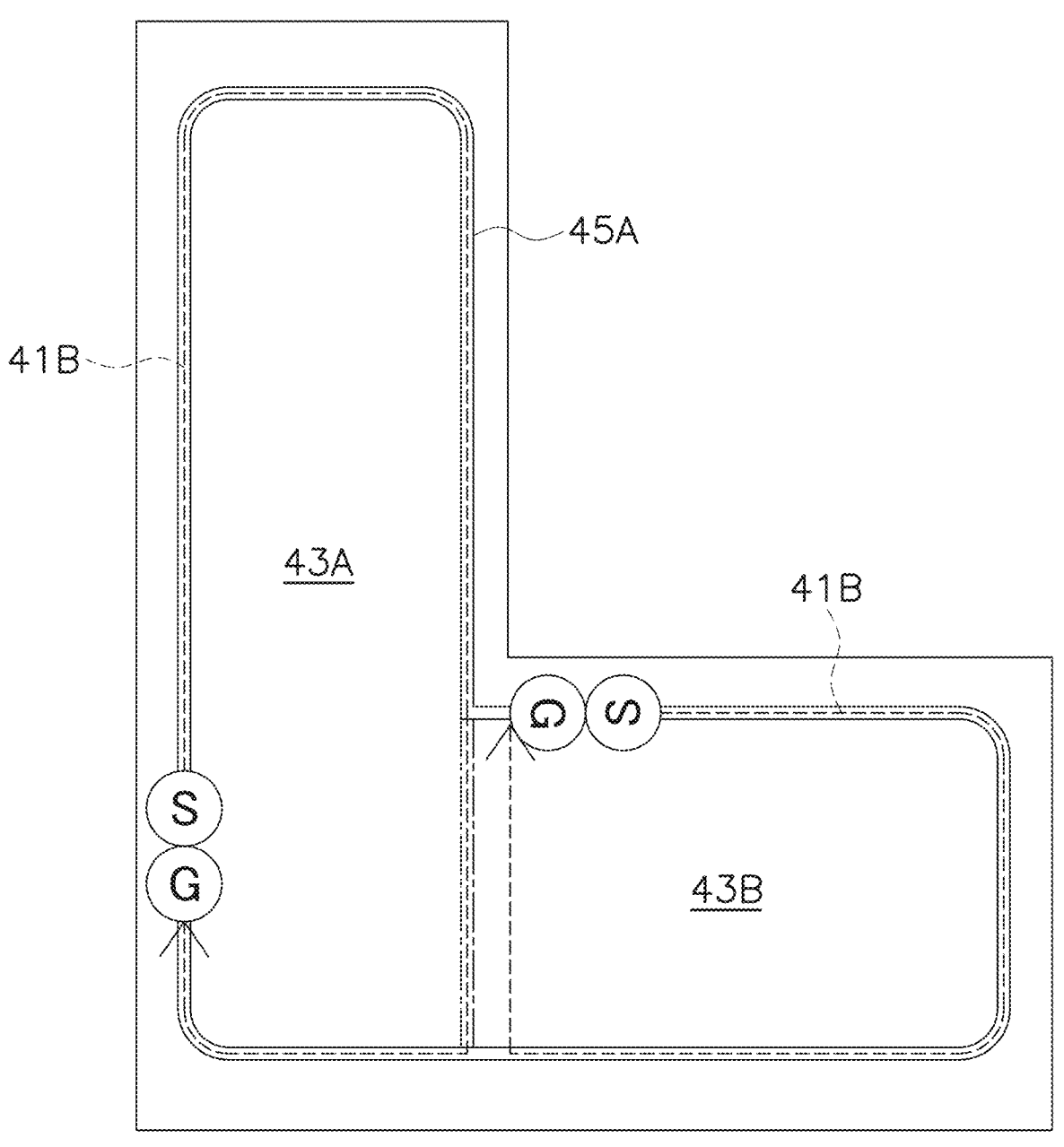
FIG. 24 is a schematic plan view of the test travel path according to a second variation of a preferred embodiment of the present invention.

In a second variation, if the area is divided into two areas as illustrated in FIG. 24, a test travel path 41B coincides with a portion of the outer rounding path 45A in a first area 43A and a second area 43B, and is at least a portion of an outer periphery path of each area.

Figure 25:
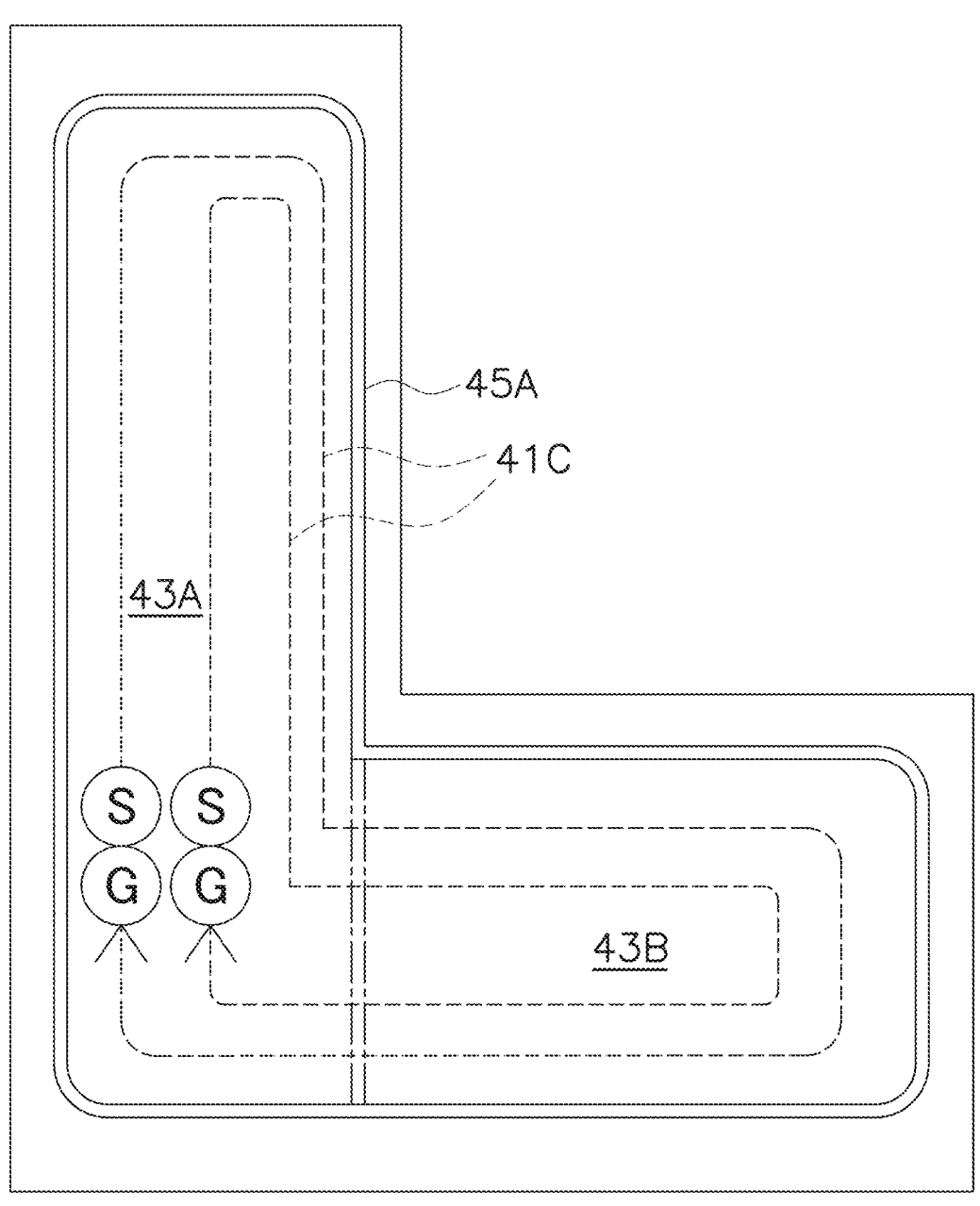
FIG. 25 is a schematic plan view of the test travel path according to a third variation of a preferred embodiment of the present invention.

In a third variation, a test travel path 41C is one or more inner rounding paths obtained by shifting the outer rounding path 45A inward as illustrated in FIG. 25. In this case, the inside situation can be recognized more accurately. Note that in FIG. 25, in the case where the area is divided into two areas, each inner rounding path is formed so as to go around the internal circumference of the whole area. In addition, if the area is not divided, the test travel path may be one or more inner rounding paths obtained by shifting the outer rounding path inward.

Figure 26:
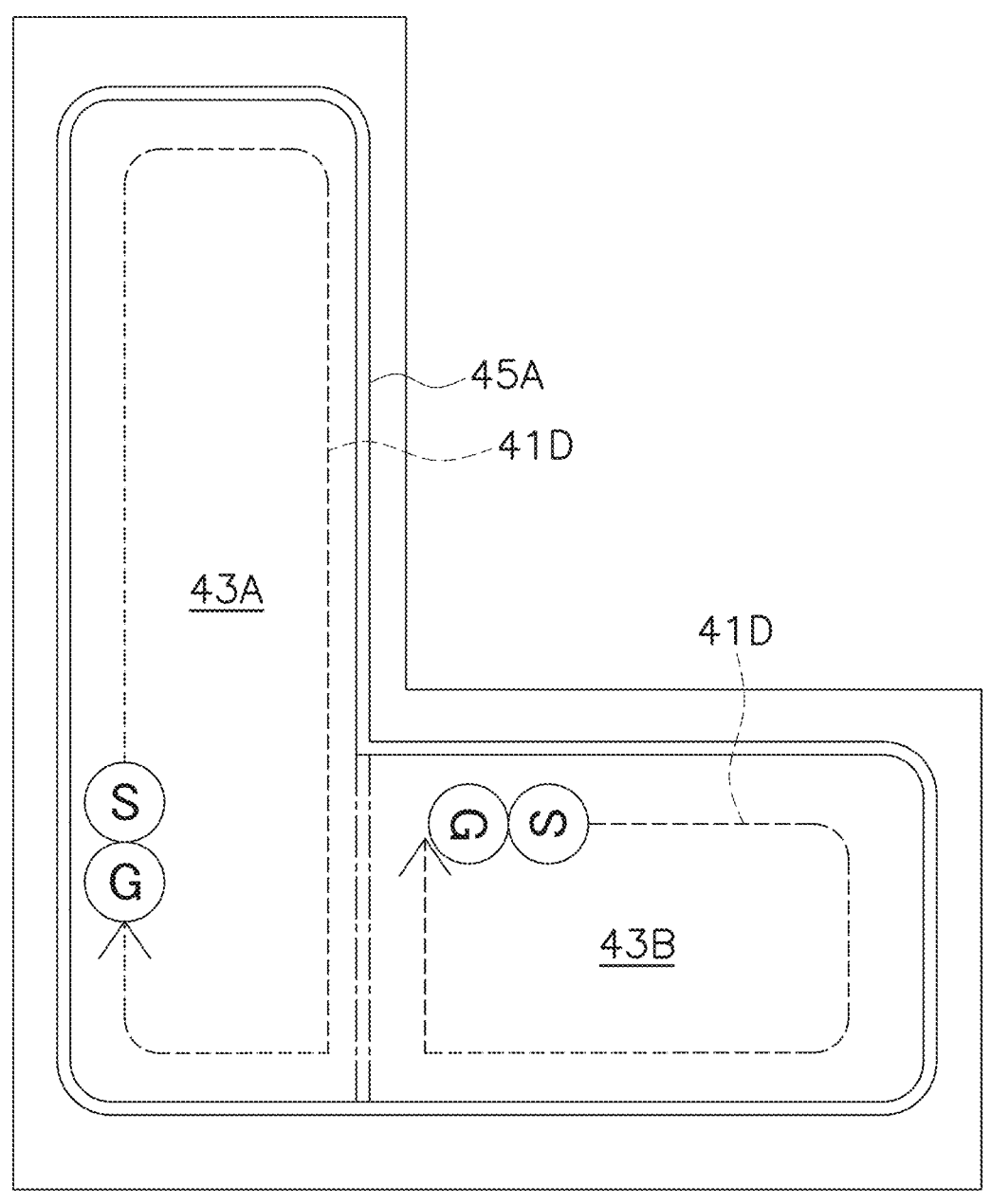
FIG. 26 is a schematic plan view of the test travel path according to a fourth variation of a preferred embodiment of the present invention.

In a fourth variation, a test travel path 41D is one or more rounding paths obtained by shifting the outer rounding path inward as illustrated in FIG. 26. In this case, the inside situation can be recognized more accurately. Note that in FIG. 26, in the case where the area is divided into two areas, the test travel path 41D is similar to a portion of the outer rounding path 45A in the first area 43A and in the second area 43B.

Figure 27:
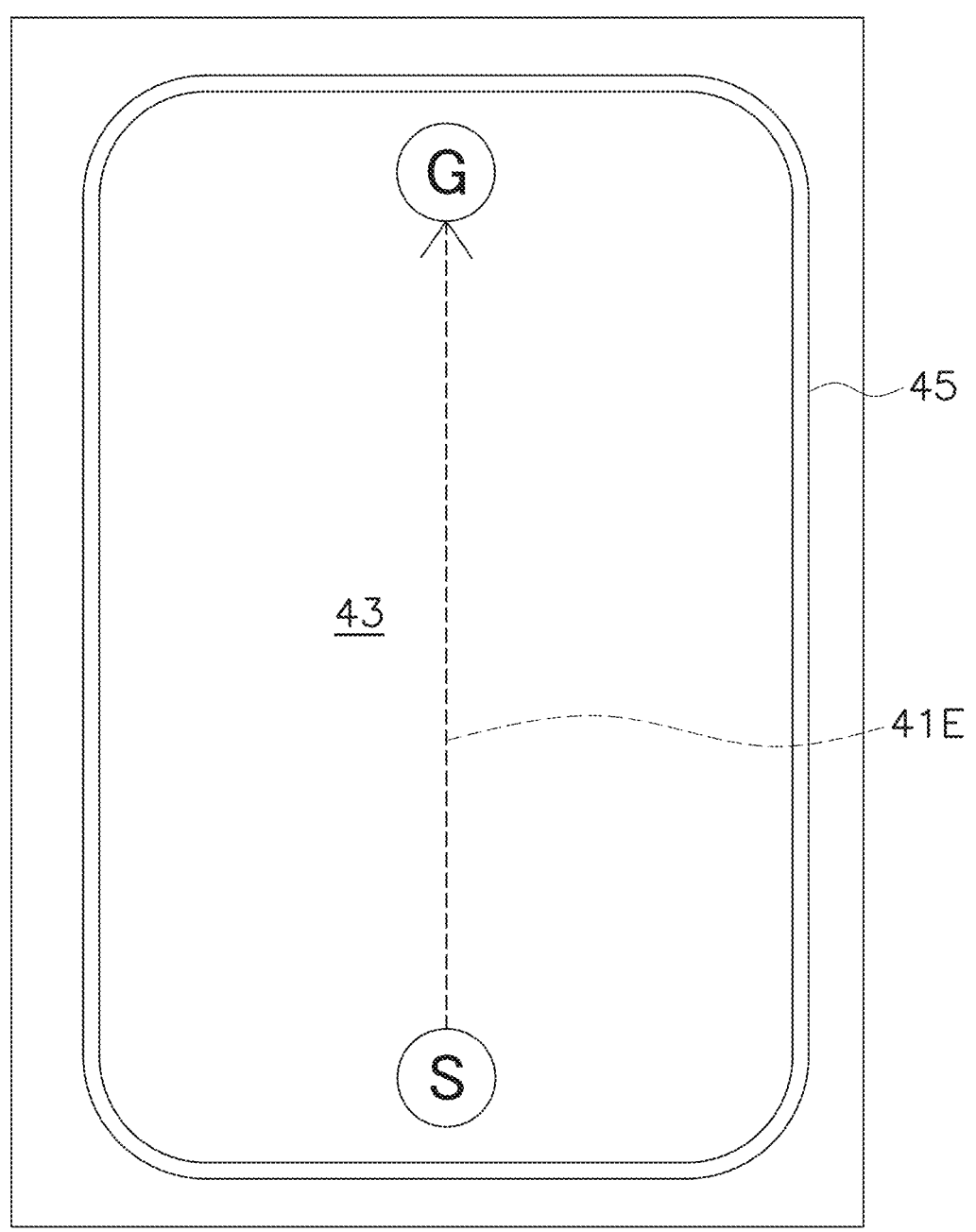
FIG. 27 is a schematic plan view of the test travel path according to a fifth variation of a preferred embodiment of the present invention.

In a fifth variation, a test travel path 41E is a travel path along the center portion in the whole area 43 as illustrated in FIG. 27. Specifically, the test travel path 41E extends linearly in a longitudinal direction of the whole area 43. In this case, the inside situation can be recognized more accurately.

Figure 28:
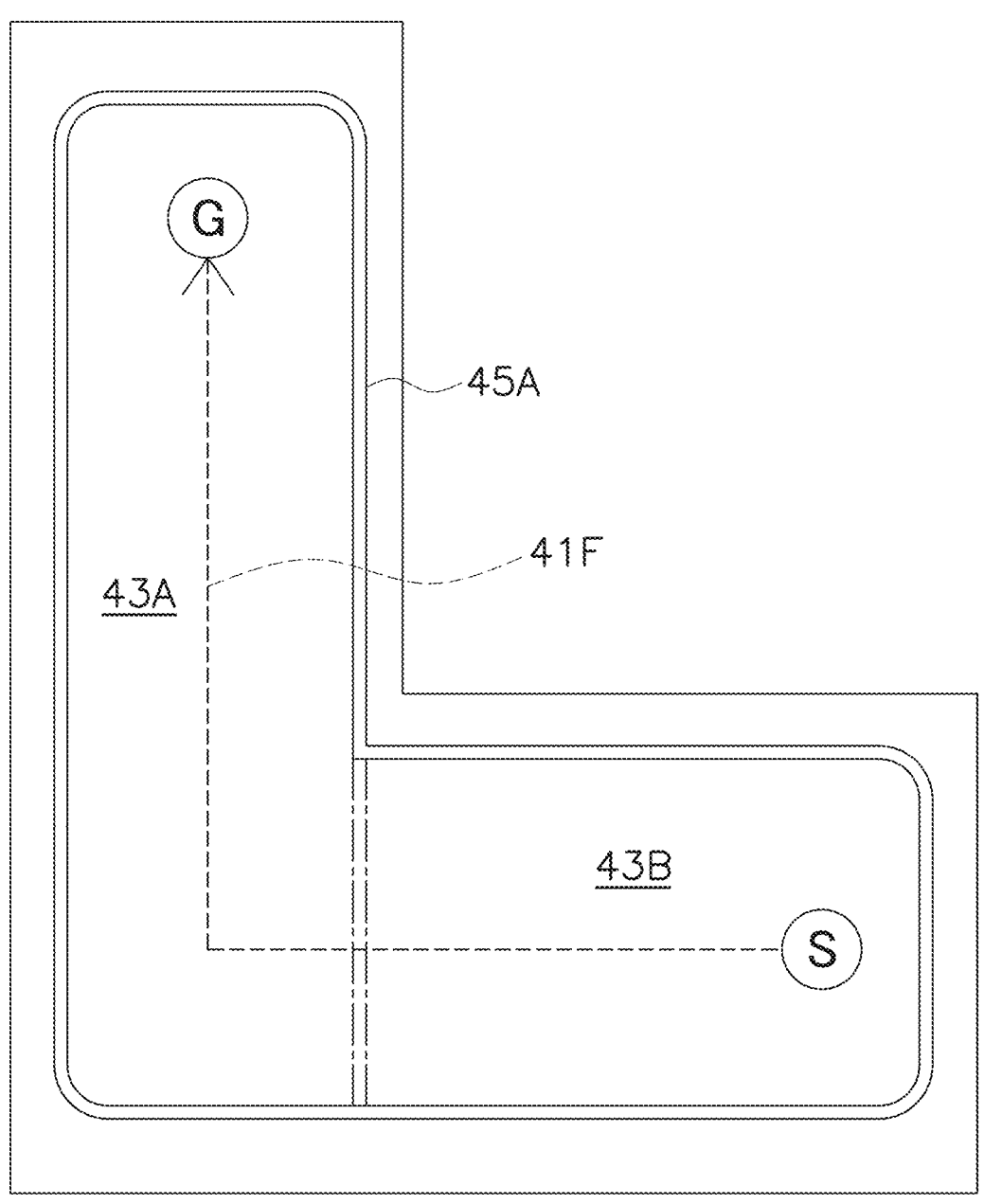
FIG. 28 is a schematic plan view of the test travel path according to a sixth variation of a preferred embodiment of the present invention.

In a sixth variation, as illustrated in FIG. 28, in the case where the area is divided into two areas, a test travel path 41F is continuously formed between the first area 43A and the second area 43B.

Figure 29:
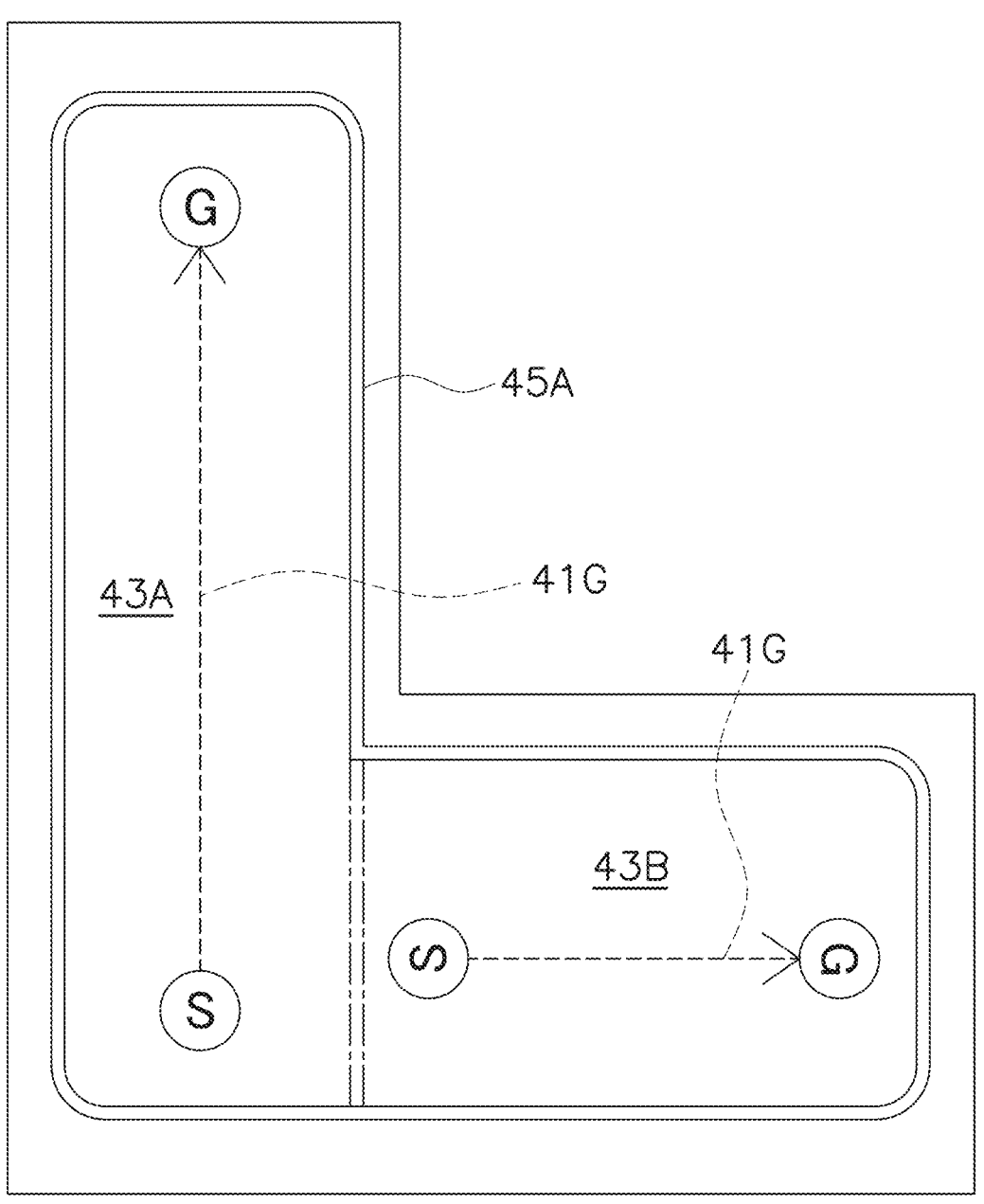
FIG. 29 is a schematic plan view of the test travel path according to a seventh variation of a preferred embodiment of the present invention.

In a seventh variation, as illustrated in FIG. 29, in the case where the area is divided into two areas, a test travel path 41G is formed separately in the first area 43A and in the second area 43B.

4. Other Preferred Embodiments

Although a plurality of preferred embodiments of the present invention are described above, the present invention is not limited to the preferred embodiments described above but can be variously modified within the scope of the present invention without deviating from the spirit thereof. In particular, the plurality of preferred embodiments and variations described in this specification can be arbitrarily combined as necessary.

The autonomous traveling devices may be any traveling device other than the cleaning machine that autonomously performs cleaning operation. For instance, the autonomous traveling device may be an advertising robot.

The autonomous traveling device may include only a travel unit (and a control unit that controls the same) for autonomous travel. In this case, for example, a robot (device) having desired functions can be provided by combining the autonomous traveling device and a robot system exerting the desired functions.

In the first preferred embodiment, the grid layer is a layer different from the global map, but it may be possible to manage them as a unit. This preferred embodiment can be applied to any autonomous traveling body other than that having a body of a round shape so as to perform spin turn.

Preferred embodiments of the present invention can be applied widely to autonomous travel path planning methods for planning a travel path for autonomous traveling bodies.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An autonomous travel path planning method to plan a path for an autonomous traveling body to autonomously travel, the method comprising:

detecting, by a sensor, obstacle information;

estimating position information based on the obstacle information detected by the sensor;

obtaining a travel area, based on the position information, to perform filling travel in an environmental map;

creating a first grid area covering an area corresponding to the travel area with a plurality of grids;

calculating a deviation width of a body of the autonomous traveling body from the travel area when the autonomous traveling body changes its direction, based on a body size of the autonomous traveling body, a turning radius thereof, a turning movement distance, and a grid size;

creating one or more inner rounding paths covering at least a portion of the deviation width;

creating a second grid area including a boundary at a position corresponding to an innermost inner rounding path by validating, of the plurality of grids included in the first grid area, a first grid in which the innermost inner rounding path is included, and a second grid inside of the first grid area and inward of the first grid, and invalidating other grids of the first grid area;

creating a filling travel path so as to fill an inside of the second grid area; and controlling the autonomous traveling body to autonomously travel along the filling travel path.

2. The autonomous travel path planning method according to claim 1, wherein the creating one or more inner rounding paths includes calculating a maximum number of paths necessary to cover an entirety of the deviation width.

3. The autonomous travel path planning method according to claim 1, wherein the obtaining the travel area includes receiving an input from a user regarding a boundary of the travel area, and creating an outer periphery teaching path, so as to determine the travel area; and the method further includes determining an autonomous travel path by continuously connecting an outer rounding path created based on the outer periphery teaching path, the filling travel path, and the one or more inner rounding paths.

4. The autonomous travel path planning method according to claim 3, further comprising:

setting a start position of the filling travel path on the outer rounding path; and setting an end position of the filling travel path in a position shifted inward from the start position inner than the outer rounding path.

5. The autonomous travel path planning method according to claim 1, further comprising:

creating a test travel path;

causing the autonomous traveling body to travel the test travel path; and detecting, by the sensor, an environmental change.

6. The autonomous travel path planning method according to claim 5, further comprising providing a notification of the environmental change detected while the autonomous traveling body is traveling the test travel path.

7. The autonomous travel path planning method according to claim 5, further comprising stopping the test travel after the environmental change is detected while the autonomous traveling body is traveling the test travel path.

8. The autonomous travel path planning method according to claim 7, further comprising returning the autonomous traveling body to a position on the test travel path after stopping the test travel.

9. The autonomous travel path planning method according to claim 7, further comprising moving the autonomous traveling body to a position in the travel area after stopping the test travel.

10. The autonomous travel path planning method according to claim 1, wherein the sensor is a laser range finder.

* * * * *